United States Patent
Okawa

(10) Patent No.: US 9,979,978 B2
(45) Date of Patent: May 22, 2018

(54) IMAGE ENCODING APPARATUS, METHOD OF IMAGE ENCODING, AND RECORDING MEDIUM, IMAGE DECODING APPARATUS, METHOD OF IMAGE DECODING, AND RECORDING MEDIUM

(71) Applicant: CANON KABUSHIKI KAISHA, Tokyo (JP)

(72) Inventor: Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/657,580

(22) Filed: Jul. 24, 2017

(65) Prior Publication Data

US 2017/0324970 A1 Nov. 9, 2017

Related U.S. Application Data

(63) Continuation of application No. 14/411,287, filed as application No. PCT/JP2013/004003 on Jun. 26, 2013.

(30) Foreign Application Priority Data

Jun. 29, 2012 (JP) ................................ 2012-147153

(51) Int. Cl.
  *H04N 7/12* (2006.01)
  *G06K 9/36* (2006.01)
  (Continued)

(52) U.S. Cl.
  CPC ......... *H04N 19/436* (2014.11); *H04N 19/513* (2014.11); *H04N 19/70* (2014.11);
  (Continued)

(58) Field of Classification Search
  CPC .... H04N 19/44; H04N 19/119; H04N 19/436; H04N 19/513
  See application file for complete search history.

(56) References Cited

U.S. PATENT DOCUMENTS 9,077,960 B2 * 7/2015 Srinivasan ........... H04N 19/176
9,615,108 B2 * 4/2017 Sole ...................... H04N 19/61
(Continued)

FOREIGN PATENT DOCUMENTS

JP 2011-217082 A 10/2011
JP 2012-502592 A 1/2012

OTHER PUBLICATIONS

Jeon, et al., "Huffman coding of DCT coefficients using dynamic codeword assignment and adaptive codebook selection", Signal Processing: Image Communication, vol. 12, pp. 253-262, 1998, received Nov. 15, 1995.

(Continued)

*Primary Examiner* — Tsion B Owens
(74) *Attorney, Agent, or Firm* — Canon USA, Inc. I.P. Division

(57) ABSTRACT

Encoded data is decoded based on tile data division information, tile data position information, block line data division information, and block line data position information. The tile data division information indicates whether the encoded data is composed of tile data items that serve as encoded data items of tiles. The tile data position information indicates positions of the tile data items. The block line data division information indicates whether each tile data item is composed of first block line data and second block line data. The first block line data serves as encoded data of a first block line that is a set of blocks arranged linearly. The second block line data serves as encoded data of a second block line next to the first block line. The block line data position information indicates a position of the second block line data.

20 Claims, 25 Drawing Sheets

(51) Int. Cl.
*H04N 19/436* (2014.01)
*H04N 19/70* (2014.01)
*H04N 19/513* (2014.01)
*H04N 19/119* (2014.01)
*H04N 19/46* (2014.01)
*H04N 19/174* (2014.01)
*H04N 19/44* (2014.01)

(52) U.S. Cl.
CPC .......... *H04N 19/119* (2014.11); *H04N 19/174* (2014.11); *H04N 19/44* (2014.11); *H04N 19/46* (2014.11)

(56) References Cited

U.S. PATENT DOCUMENTS

| | | | | |
|---|---|---|---|---|
| 2007/0217699 | A1* | 9/2007 | Mahiar | H04N 19/147 382/232 |
| 2012/0230428 | A1* | 9/2012 | Segall | H04N 19/176 375/240.25 |
| 2013/0301944 | A1* | 11/2013 | Kim | G06T 9/00 382/233 |
| 2014/0247875 | A1* | 9/2014 | Hattori | H04N 19/00533 375/240.12 |
| 2014/0334557 | A1* | 11/2014 | Schierl | H04N 19/91 375/240.27 |
| 2015/0117538 | A1* | 4/2015 | Sjoberg | H04N 19/70 375/240.16 |

OTHER PUBLICATIONS

Lee, et al., "Simplification on tiles and slices", Joint Collaborative Team on Video Coding (JCT-VC) of ITU-T SG16 WP3 and ISO/IEC JTC1/SC29/WG11, 8th Meeting, JCTVC-H0348, Feb. 2012.
Misra, et al., AHG4: Entry point signaling for wavefront substreams within tiles', Joint Collaborative Team on Video coding (JCT-VC) of ITU-T SG16 WP3 and ISO/IEC JTC1/SC29/WG11, 10th Meeting, JCTVC-J0322, Jul. 2012.

* cited by examiner

IMAGE ENCODING APPARATUS, METHOD OF IMAGE ENCODING, AND RECORDING MEDIUM, IMAGE DECODING APPARATUS, METHOD OF IMAGE DECODING, AND RECORDING MEDIUM

CROSS-REFERENCE TO RELATED APPLICATIONS

This application is a continuation of U.S. patent application Ser. No. 14/411,287, filed on Dec. 24, 2014, that is a national phase application of international patent application PCT/JP2013/004003 filed on Jun. 26, 2013, which patent(s) and patent applications are hereby incorporated by reference herein in their entireties. This application also claims the benefit of Japanese Patent Application No. 2012-147153, filed Jun. 29, 2012, which is hereby incorporated by reference herein in its entirety.

TECHNICAL FIELD

The present invention relates to an image encoding apparatus, a method of image encoding, and a recording medium, an image decoding apparatus, a method of image decoding, and a recording medium. In particular, the invention relates to encoding and decoding based on parallel processing of images in which each picture is divided into rectangular tiles.

BACKGROUND ART

One of known encoding methods used for movie compression recording is H.264/MPEG-4 AVC (hereinafter, "H.264") (ITU-T H.264 (03/2010) Advanced video coding for generic audio visual services). According to H.264, each picture can be divided into a plurality of slices and image data can be encoded on a slice-by-slice basis. The slices have little dependence on one another. Accordingly, the slices can be subjected to encoding or decoding in parallel. One of significant benefits of the division into slices is that the execution of parallel processing by, for example, a multicore CPU enables reduction of processing time.

Furthermore, each slice is encoded by a related-art binary arithmetic encoding scheme used in H.264. Specifically, each syntax element is binarized, thus generating a binary signal. Each syntax element is assigned the probability of occurrence as a table (hereinafter, "probability table") in advance. The binary signal is subjected to arithmetic encoding based on the probability table. The probability table is used as decoding information for decoding subsequent symbols during decoding and is used as encoding information for encoding subsequent symbols during encoding. Each time encoding is performed, the probability table is updated based on statistical information indicating whether the encoded binary signal is a symbol assigned higher probability or not.

Recently, activities for international standardization of higher-efficiency encoding as a successor to H.264 have been started and Joint Collaborative Team on Video Coding (JCT-VC) has been established by ISO/IEC and ITU-T. According to JCT-VC, the standardization of High Efficiency Video Coding (HEVC) is in progress.

For the standardization of HEVC, various encoding tools have been broadly examined from viewpoints of not only improvement of encoding efficiency but also ease of implementation and reduction of processing time. For reduction of processing time, schemes for enhancing parallelism have been examined. One of them is a scheme, called Wavefront, for parallel entropy encoding/decoding (JCT-VC document JCTVC-I1003.doc, the Internet <http://phenix.int-evey.fr/jct/doc). Since a target binary signal to be encoded has to be encoded using the probability table updated constantly, parallel processing cannot be performed if statistical information is not reset. If the statistical information is reset, the encoding efficiency is unfortunately reduced. On the other hand, according to Wavefront, the probability table upon encoding of a plurality of blocks at predetermined positions is used for the left block in the next line, thus achieving parallel encoding of blocks on a line-by-line basis while preventing a reduction in encoding efficiency. Although Wavefront has been mainly described with respect to encoding, the same applies to decoding.

According to HEVC, the schemes for enhancing the parallelism include tiling. According to this technique, tiles allow a picture to be divided into rectangular regions that can independently be processed. Thus, high throughput can be achieved by parallel encoding/decoding and the capacity of a memory included in each of an encoding apparatus and a decoding apparatus can be reduced.

According to HEVC, processing, such as tiling or Wavefront, has been exclusively performed using a symbol tiles_or_entropy_coding_sync_idc. If the symbol has a value of 0, this means that a picture is composed of a single tile and Wavefront parallel processing is not performed. If the symbol has a value of 1, this means that the picture is composed of a plurality of tiles but Wavefront parallel processing is not performed. If the symbol has a value of 2, this means that the picture is composed of a single tile and parallel processing, such as Wavefront, is performed. If the symbol has a value of 3, this means that the picture is composed of a single tile, Wavefront parallel processing is not performed, and entropy slices which can independently be decoded are used. Other values cannot be used. The reason is as follows. If a plurality of processes are performed in parallel on a sufficiently low definition image, controlling such parallel processing would be complicated. Because the degree of complexity would be too high for the picture size, exclusive processing is performed. In particular, real-time decoding of a very large image, such as an 8 k or 4 k image, requires high parallelism. The parallelism can be enhanced by dividing the image into very small tiles, but the encoding efficiency is reduced because information available for prediction is limited at the boundary between tiles. Wavefront parallel processing performed on such a very large image divided into block lines requires a large-capacity line buffer and, unfortunately, does not enable the parallelism to be enhanced more than that using tiles, because the block lines have a dependence on each other, the dependence including the probability table. As regards such a large image, it is necessary to divide the image into segments having a certain size, allocate the segments to computer nodes, and operate a plurality of processors for each node. For example, in the case where tiles are allocated to nodes and processing is performed on a node-by-node basis, unfortunately, parallel processing, such as Wavefront, cannot be performed in the tiles.

The present invention provides an encoding format that enables multi-stage parallel processing to enhance parallelism of processes and achieve high-speed encoding and decoding.

SUMMARY OF INVENTION

The present invention provides an image decoding apparatus that decodes encoded data obtained by dividing a frame of image data into rectangular tiles and encoding the image data on a tile-by-tile basis, the apparatus including the following elements. A deriving unit is configured to derive tile data division information, tile data position information, block line data division information, and block line data position information from the encoded data. The tile data division information indicates whether the encoded data is composed of tile data items that serve as encoded data items of the tiles. The tile data position information indicates positions of the tile data items. The block line data division information indicates whether each tile data item is composed of first block line data and second block line data, the first block line data serving as encoded data of a first block line that is a set of blocks arranged linearly, the second block line data serving as encoded data of a second block line next to the first block line. The block line data position information indicates a position of the second block line data. A first decoding unit is configured to decode the first block line data based on the information derived by the deriving unit. A second decoding unit is configured to decode the second block line data based on the information derived by the deriving unit and decoding information obtained by decoding encoded data of a block in a predetermined position belonging to the first block line.

According to the present invention, an encoding format that enables multi-stage parallel processing is provided, thus enhancing the parallelism of processes and achieving high-speed encoding and decoding.

Further features of the present invention will become apparent from the following description of exemplary embodiments with reference to the attached drawings.

DESCRIPTION OF EMBODIMENTS

Preferred embodiments of the present invention will be described in detail below with reference to the accompanying drawings. Configurations illustrated in the following embodiments are intended for purposes of illustration only and the present invention is not limited to the illustrated configurations.

First Embodiment

Figure 2:
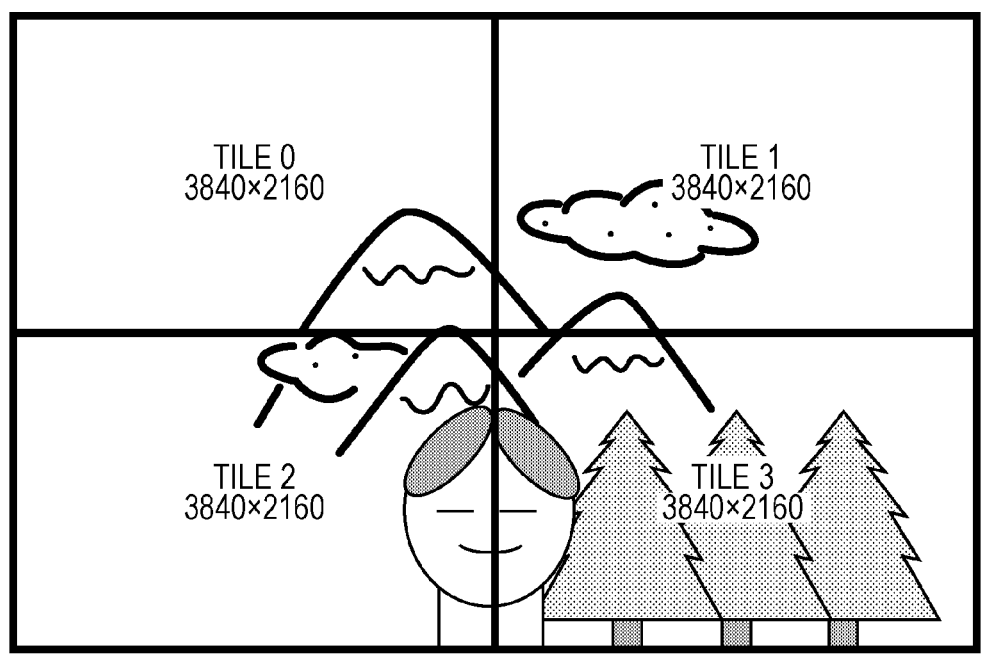
FIG. 2 is a diagram illustrating division of an image into tiles.
Figure 3:
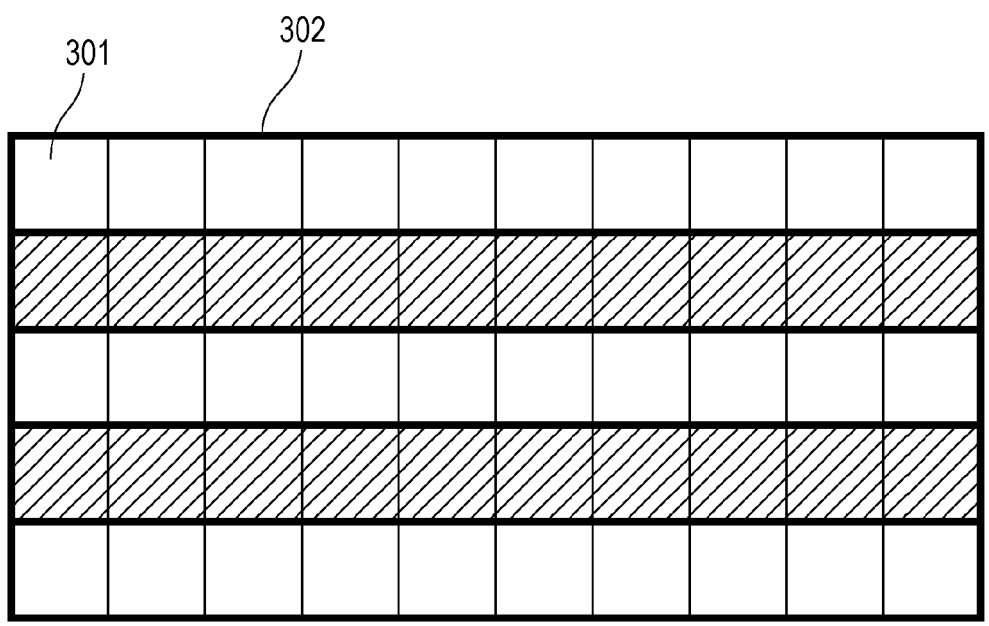
FIG. 3 is a diagram illustrating division of a tile into block lines.

In an image encoding format to be decoded by an image decoding apparatus according to a first embodiment of the present invention, one frame is divided into a plurality of tiles that are rectangular regions. FIG. 2 illustrates tile arrangement in the first embodiment. Referring to FIG. 2, a frame of 7680 horizontal pixels×4320 vertical pixels is divided into four tiles arranged in an array of two horizontal tiles×two vertical tiles. In the encoding format in the present invention, each block is composed of 16 horizontal pixels× 16 vertical pixels and encoding or decoding is performed on a block-by-block basis. Although each block is composed of 16×16 pixels in the present embodiment, the present invention is not limited thereto. Each block may be composed of 32×32 pixels or 64×64 pixels. The size of each tile is a multiple of the size of the block. In FIG. 2, each tile is composed of 240 horizontal blocks×135 vertical blocks. The tile is further divided into a plurality of block lines. Each block line is a set of blocks arranged linearly in the tile as illustrated in FIG. 3. Referring to FIG. 3, each square defined by thin lines denotes a block 301 and each rectangle defined by thick lines denotes a block line 302.

Figure 1:
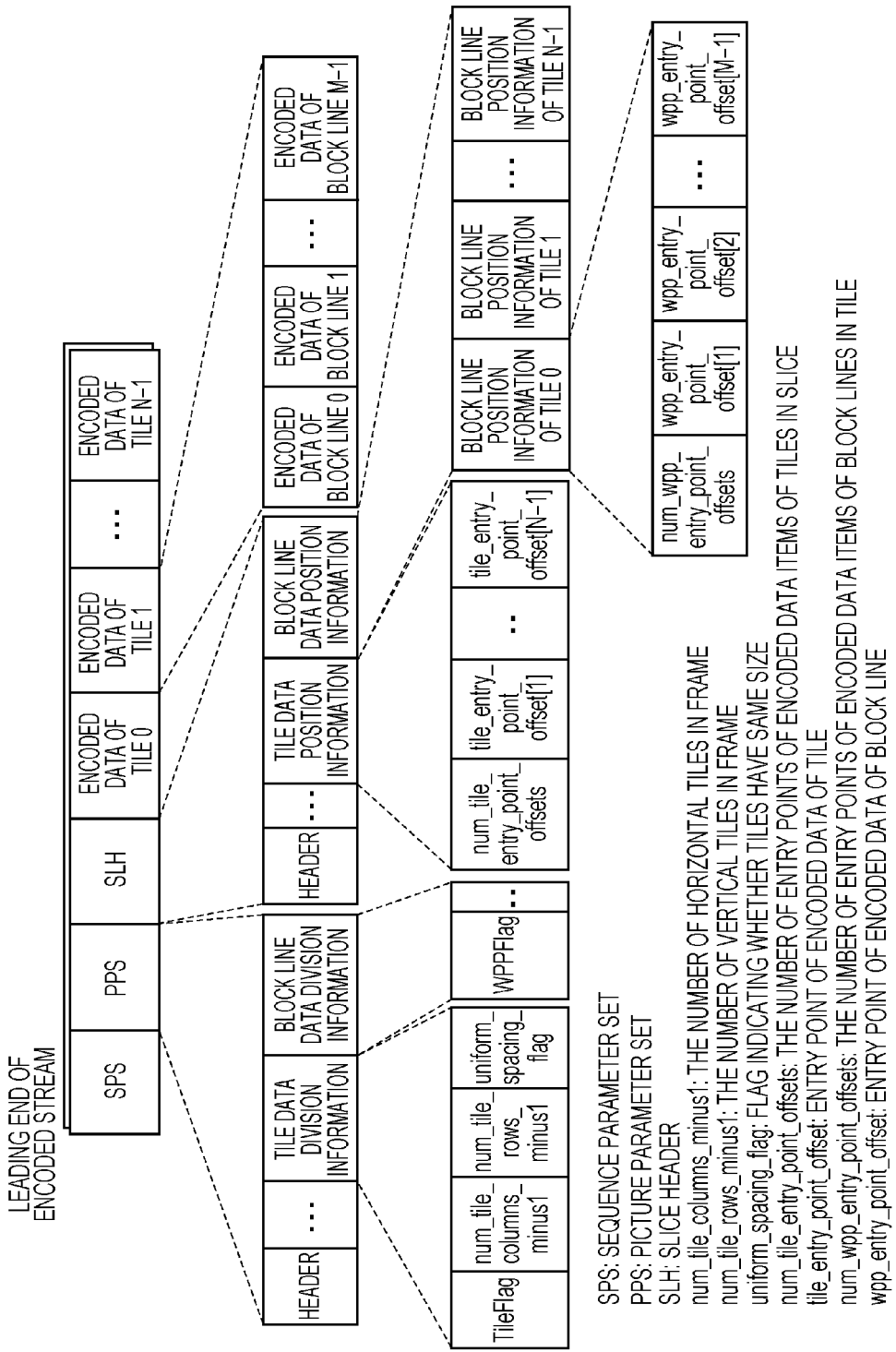
FIG. 1 is a diagram illustrating an image encoding format to be decoded by an image decoding apparatus according to a first embodiment.

FIG. 1 illustrates a format of HEVC-encoded data in the present embodiment. In FIG. 1, the encoded data includes a sequence parameter set that is header information containing information about sequence encoding. The encoded data further includes a picture parameter set that is header information containing information about picture encoding, a slice header that is header information containing information about slice encoding, and multiple encoded data items of tiles. The picture parameter set includes tile data division information and block line data division information. The slice header includes tile data position information and block line data position information.

The picture parameter set includes, as the tile data division information, a flag TileFlag indicating whether a frame has been divided into tiles and image data of each tile has been encoded. If the flag TileFlag has a value of 1, this indicates that the frame has been divided into tiles and image data of each tile has been encoded. If the flag TileFlag does not have a value of 1, this indicates that the frame encoded has not been divided into tiles. In the case where the flag TileFlag has a value of 1, information num_tile_columns_minus1 indicating the number of horizontal tiles in the frame, information num_tile_rows_minus1 indicating the number of vertical tiles, and a flag uniform_spacing_flag indicating the shape of a tile are arranged. The information num_tile_columns_minus1 has a value obtained by subtracting 1 from the actual number of horizontal tiles in the frame. The information num_tile_rows_minus1 has a value obtained by subtracting 1 from the actual number of vertical tiles. Referring to FIG. 1, N denotes the number of tiles in a slice, the number of tiles being uniquely determined by (num_tile_columns_minus1+1)×(num_tile_rows_minus1+1). The flag uniform_spacing_flag indicates whether the tiles in the frame have the same size. If this flag has a value of 1, this indicates that the tiles have the same size. FIG. 2 illustrates a case where the flag uniform_spacing_flag=1, namely, the tiles having the same size are used. If this flag has a value of 0, this indicates that the tiles have difference sizes. Accordingly, the different sizes have to be encoded as syntax element.

The picture parameter set includes, as the block line data division information, a flag WPPFlag. If the flag WPPFlag has a value of 1, this indicates that each of the tiles has been divided into block lines and image data of each block line has been encoded. Although the block line data division information and the tile data division information include different flags in the present embodiment, the present invention is not limited thereto. It is only required to know that tile data division and block line data division are used in combination. For example, a syntax element indicating the combination of the two flags may be provided and be defined as follows.

If this syntax element has a value of 0, this means the absence of tile data division and block line data division. If the syntax element has a value of 1, this means the presence of tile data division and the absence of block line data division. If the syntax element has a value of 2, this means the absence of tile data division and the presence of block line data division. If the syntax element has a value of 3, this means the presence of tile data division and block line data division.

The slice header includes the tile data position information if the flag TileFlag has a value of 1, and further includes the block line data position information if the flag WPPFlag has a value of 1. The tile data position information includes a syntax element num_tile_entry_point_offsets and syntax elements tile_entry_point_offset. The block line data position information includes sets equal in number to the tiles, each set including a syntax element num_wpp_entry_point_offsets and syntax elements wpp_entry_point_offset. The syntax element num_tile_entry_point_offsets has a value obtained by subtracting 1 from N that indicates the number of tiles in the slice. The syntax element num_wpp_entry_point_offsets has a value obtained by subtracting 1 from M that indicates the number of block lines in the tile. If the flag TileFlag has a value of 0, the syntax element num_tile_entry_point_offsets is treated as having a value of 0. If the flag WPPFlag has a value of 0, a symbol corresponding to the syntax element num_wpp_entry_point_offsets is omitted and the syntax element num_wpp_entry_point_offsets is treated as having a value of 0.

The syntax element num_tile_entry_point_offsets indicates the number of entry points of encoded data items of the tiles in the slice. The number of entry points of encoded data items of the tiles is uniquely determined by the number of tiles included in the slice. When the number of tiles is 2, the number of entry points is 1. When the number of tiles is 4, the number of entry points is 3. In the present embodiment, it is assumed that the frame is composed of a single slice including four tiles. That is, the syntax element num_tile_entry_point_offsets has a value of 3. The syntax elements tile_entry_point_offset each indicate an entry point of encoded data of the tile, namely, a leading position of the encoded data of the tile. The number of syntax elements tile_entry_point_offset is equal to the value indicated by the syntax element num_tile_entry_point_offsets. A syntax element tile_entry_point_offset[i] indicates an entry point of encoded data of the ith tile. Since it is known that encoded data of the zeroth tile (Tile 0) immediately follows the slice header, an entry point of the zeroth tile is omitted. The size of encoded data of the (i−1)th tile has been encoded as the syntax element tile_entry_point_offset[i]. If the syntax element num_tile_entry_point_offsets has a value of 0, no mention is made of the syntax elements tile_entry_point_offset because the syntax elements tile_entry_point_offset are not needed.

The syntax element num_wpp_entry_point_offsets indicates the number of entry points of encoded data items of block lines belonging to the tile. Since the number of vertical blocks in each tile is 135 in the present embodiment, the syntax element num_wpp_entry_point_offsets has a value of 134. The syntax elements wpp_entry_point_offset each indicate an entry point of encoded data of the block line, namely, a leading position of the encoded data of the block line. A syntax element wpp_entry_point_offset [j] indicates an entry point of encoded data of the jth block line. Since a leading position of encoded data of the zeroth block line is the same as the leading position of encoded data of a tile to which the block line belongs, the syntax element wpp_entry_point_offset is omitted. The size of encoded data of the (j−1)th block line has been encoded as the syntax element wpp_entry_point_offset [j]. If the syntax element num_wpp_entry_point_offsets has a value of 0, no mention is made of the syntax elements wpp_entry_point_offset because the syntax elements wpp_entry_point_offset are not needed.

Figure 4:
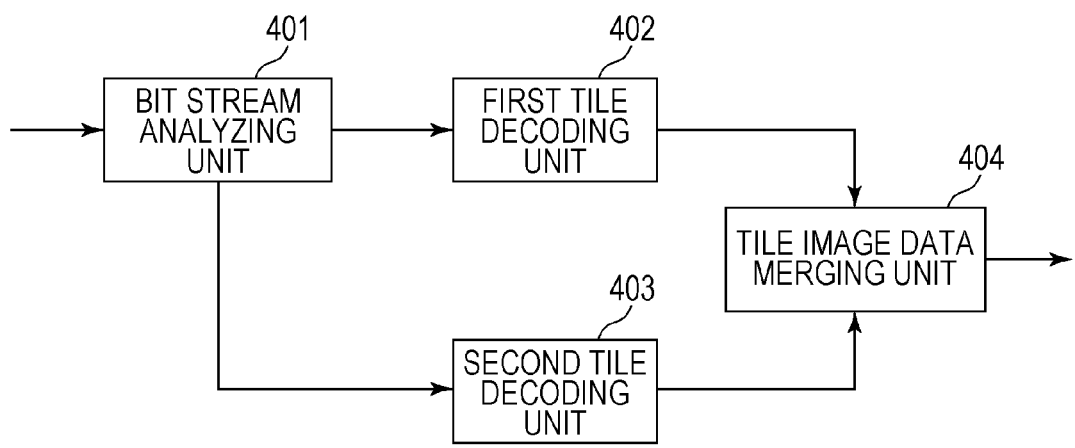
FIG. 4 is a block diagram illustrating a configuration of each of the image decoding apparatus according to the first embodiment and an image decoding apparatus according to a second embodiment.

FIG. 4 illustrates a configuration of the image decoding apparatus for decoding encoded data in the above-described image encoding format.

In FIG. 4, a bit stream analyzing unit 401 is configured to analyze a header including a sequence parameter set, a picture parameter set, and a slice header of input encoded data. Decoding units 402 and 403 are configured to decode the input encoded data based on input encoded parameters on a tile-by-tile basis. Although the two tile decoding units are arranged in the present embodiment, the present invention is not limited thereto. A tile image data merging unit 404 is configured to merge image data generated by the first tile decoding unit 402 and image data generated by the second tile decoding unit 403 and output the resultant data.

In the above-described configuration, the bit stream analyzing unit 401 analyzes the picture parameter set and the slice header to derive tile data division information, block line data division information, tile data position information, and block line data position information. The bit stream analyzing unit 401 supplies the encoded data following the header to the first tile decoding unit 402 or the second tile decoding unit 403 based on the above-described information. Note that a leading tile is the zeroth tile. If target blocks belong to an even-numbered tile, the encoded data of the tile is supplied to the first tile decoding unit 402. If the target blocks belong to an odd-numbered tile, the encoded data of the tile is supplied to the second tile decoding unit 403. In FIG. 2, the encoded data items of Tile 0 and Tile 2 are decoded by the first tile decoding unit 402 and the encoded data items of Tile 1 and Tile 3 are decoded by the second tile decoding unit 403.

Figure 19:
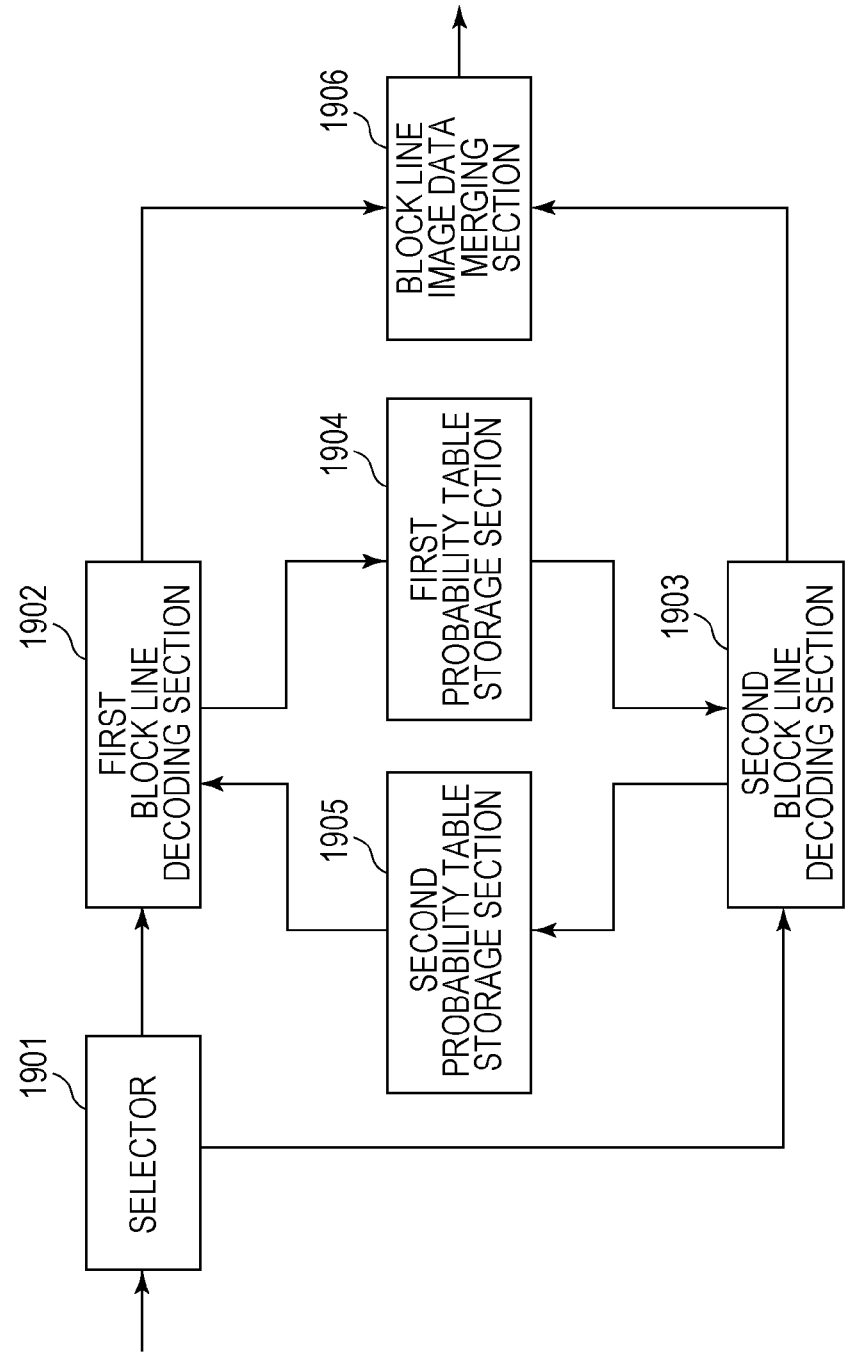
FIG. 19 is a block diagram illustrating a configuration of each tile decoding unit in the first and second embodiments.

The first tile decoding unit 402 and the second tile decoding unit 403 will be described in detail below with reference to FIG. 19, which is a block diagram of the decoding unit.

A selector 1901 is configured to determine whether a target block belongs to an even-numbered block line in the tile. The selector 1901 is supplied with encoded data on a tile-by-tile basis. If the block belongs to an even-numbered block line, the selector 1901 outputs the encoded data of the block line to a first block line decoding section 1902. If the block does not belong to an even-numbered block line, the selector 1901 outputs the encoded data of the block line to a second block line decoding section 1903. The first and second block line decoding sections 1902 and 1903 are configured to decode input encoded data of a block line on a block-by-block basis. As regards decoding, arithmetic decoding is performed. The arithmetic decoding generates and updates a probability table. A first probability table storage section 1904 is configured to store a probability table, generated by the first block line decoding section 1902, as decoding information. A second probability table storage section 1905 is configured to store a probability table, generated by the second block line decoding section 1903, as decoding information. A block line image data merging section 1906 is configured to merge image data generated by the first block line decoding section 1902 and image data generated by the second block line decoding section 1903 and output the resultant image data.

In FIG. 3, encoded data of white blocks belonging to even-numbered block lines including the top block line (zeroth line) is decoded by the first block line decoding section 1902 and encoded data of hatched blocks belonging to odd-numbered block lines is decoded by the second block line decoding section 1903. In other words, a first block line and a second block line are arranged next to each other.

In each block line decoding section, first, a probability table for a binary signal of encoded data to be decoded is selected and arithmetic decoding is performed based on the probability table to generate quantization coefficients. Subsequently, the quantization coefficients are subjected to inverse quantization based on quantization parameters, thus generating transform coefficients. Then, the transform coefficients are subjected to inverse orthogonal transform, thus generating prediction errors. Lastly, intra-frame prediction with reference to pixels surrounding the target block or inter-frame prediction with reference to another frame is performed, thus generating image data of the target block.

An operation of the image decoding apparatus according to the present embodiment will be described in detail with reference to a flowchart of FIG. 5. In the present embodiment, encoded data is supplied on a frame-by-frame basis. Each frame is composed of a plurality of tiles, each tile is divided into blocks, and encoded data is decoded on a block-by-block basis. Although data is input on a frame-by-frame basis in the present embodiment, data may be input on a slice-by-slice basis, the slice being obtained by dividing the frame. Although only intra-prediction decoding will be described in the present embodiment for ease of explanation, decoding is not limited thereto. The present embodiment may be applied to inter-prediction decoding.

In step S501, the bit stream analyzing unit 401 analyzes a header of an input bit stream. In this case, the sequence parameter set, the picture parameter set, and the slice header are analyzed. In particular, the flags TileFlag and WPPFlag in the picture parameter set are analyzed and the tile data position information and the block line data position information are derived from the slice header.

In step S502, a variable CurTile is initialized to 0. The variable CurTile indicates the number of a target tile. In step S503, the bit stream analyzing unit 401 determines the amount of transmission data (or the size of encoded data of the target tile) to be transmitted to the first tile decoding unit 402 or the second tile decoding unit 403.

Figure 9:
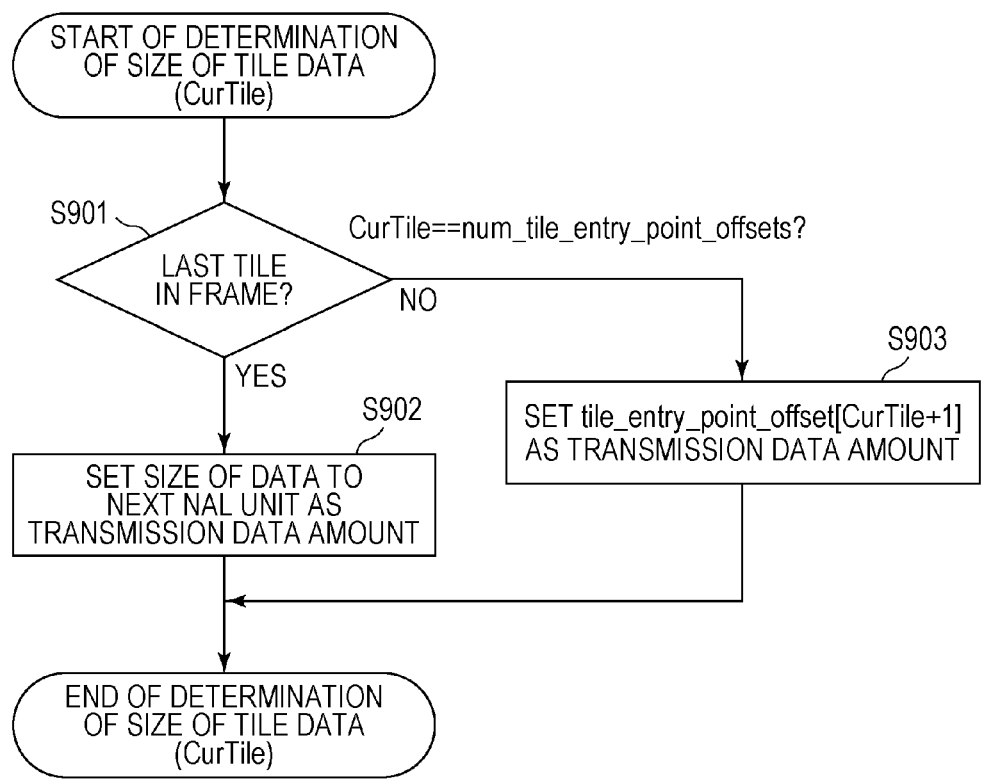
FIG. 9 is a flowchart illustrating a process of determination of the size of tile data in the first embodiment.

A process of determination of the size of tile data in the bit stream analyzing unit 401 will be described with reference to a flowchart of FIG. 9. Referring to FIG. 9, in step S901, whether the target tile is the last tile in the frame is determined. If the target tile is the last tile (YES in step S901), the process proceeds to step S902. If NO in step S901, the process proceeds to step S903.

In step S902, the size of data from the leading end of encoded data of the target tile to the next NAL unit is set as the amount of transmission data. The NAL unit is a container that stores the sequence parameter set, the picture parameter set, an encoded slice and so on. Since a specific bit sequence, for example, 0x000001, is included in the leading end of data of the NAL unit, the leading end of data can be correctly identified. In step S903, the value of a syntax element tile_entry_point_offset[CurTile+1] indicating the size of encoded data of the (CurTile)th tile is read and the transmission data amount is determined.

Referring again to FIG. 5, in step S504, tile decoding is performed in the first tile decoding unit 402 or the second tile decoding unit 403. In this case, the bit stream analyzing unit 401 outputs encoded data of an even-numbered tile to the first tile decoding unit 402 and outputs encoded data of an odd-numbered tile to the second tile decoding unit 403 such that data as much as the size determined in step S503 is transmitted. The tile decoding will be described in detail later.

In step S505, the tile image data merging unit 404 merges tile image data output from the first tile decoding unit 402 and tile image data output from the second tile decoding unit 403 to generate decoded image data and outputs the data. In step S506, whether decoding of encoded data of all of the tiles in the frame has been completed is determined. If the one frame decoding has been completed (YES in step S506), the one frame decoding is terminated. If the decoding has not been completed, the process proceeds to step S507. In step S507, the variable CurTile is incremented by one. This means that the next tile becomes a target tile.

Figure 20:
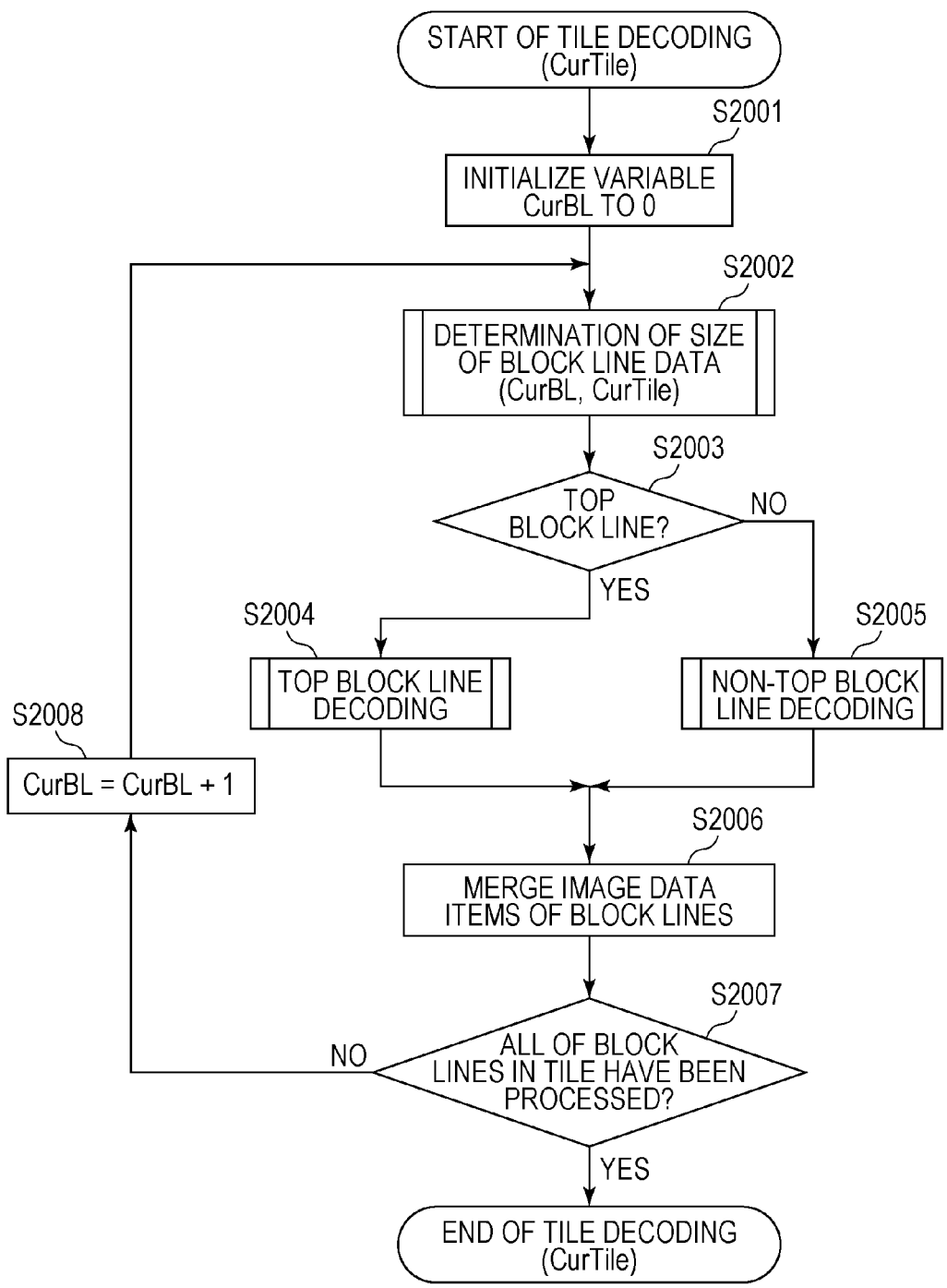
FIG. 20 is a flowchart illustrating a process of tile decoding in the first and second embodiments.

The tile decoding in step S504 will now be described in detail with reference to a flowchart of FIG. 20. Referring to FIG. 20, in step S2001, a variable CurBL is initialized to 0. The variable CurBL indicates the number of a target block line.

In step S2002, the amount of transmission data (or the size of encoded data of the target block line) to be transmitted to the first block line decoding section 1902 or the second block line decoding section 1903 by the selector 1901 is determined. A process of determination of the transmission data amount will be described in detail later. In step S2003, whether the target block line is the top block line in the tile is determined. If it is the top block line (YES in step S2003), the process proceeds to step S2004. If NO in step S2003, the process proceeds to step S2005.

In step S2004, encoded data of the top block line in the tile is decoded to generate image data of the block line. Details of processing in step S2004 will be described later. In step S2005, encoded data of a block line other than the top block line is decoded to generate image data of the block line. As regards block line decoding, whether the target block line is an even-numbered or odd-numbered block line is determined based on the variable CurBL by the selector 1901. If the target block line is an even-numbered block line, the encoded data of the target block line is decoded by the first block line decoding section 1902. If the target block line is an odd-numbered block line, the encoded data of the target block line is decoded by the second block line decoding section 1903. The encoded data items of the block lines are decoded in parallel on a block-line-by-block-line basis by the first and second block line decoding sections 1902 and 1903. Details of the decoding will also be described later.

In step S2006, the block line image data merging section 1906 merges image data of the block lines output from the first block line decoding section 1902 and image data of the block lines output from the second block line decoding section 1903 to generate tile image data and outputs the data. In step S2007, whether decoding of encoded data of all of the block lines in the tile has been completed is determined. If the decoding has been completed (YES in step S2007), the tile decoding is terminated. If NO in step S2007, the process proceeds to step S2008.

Figure 21:
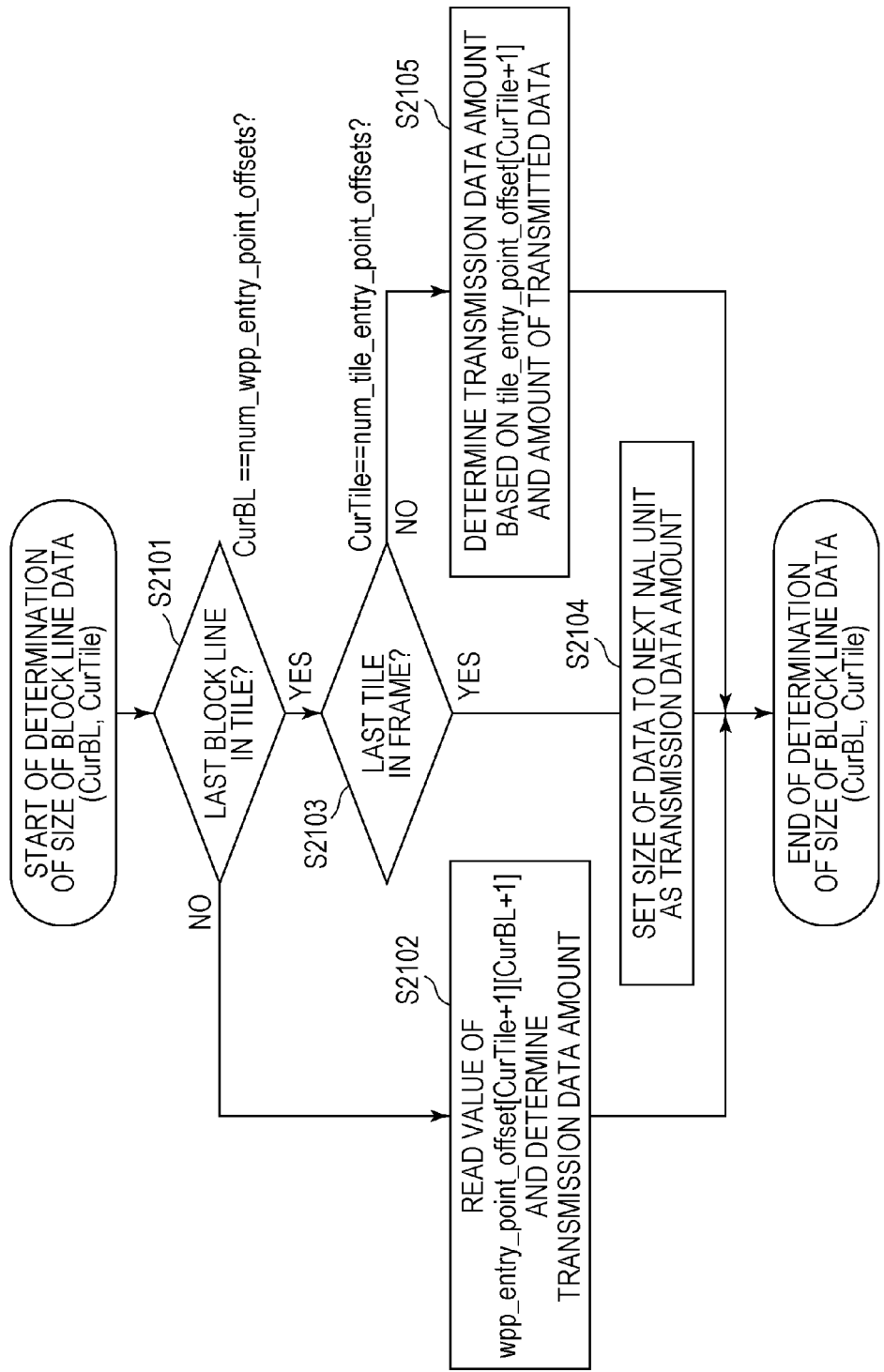
FIG. 21 is a flowchart illustrating a process of determination of the size of block line data in the first embodiment.

In step S2008, the variable CurBL is incremented by one. This means that the next block line in the target tile becomes a target block line. In step S2002, the processing or process of determination of the size of block line data in the bit stream analyzing unit 401 will be described in detail with reference to a flowchart of FIG. 21. In this process, the variable CurBL indicating the number of a target block line and the variable CurTile indicating the number of a target tile are given as inputs.

In step S2101, whether the target block line is the last block line in the tile is determined. If it is the last block line (YES in step S2101), the process proceeds to step S2103. If NO in step S2101, the process proceeds to step S2102.

In step S2102, the value of a syntax element wpp_entry_point_offset[CurTile+1][CurBL+1] indicating the size of encoded data of the (CurBL)th block line in the (CurTile)th tile is read and the amount of transmission data is determined. In step S2103, whether the target tile is the last tile in the frame is determined. If it is the last tile (YES in step S2103), the process proceeds to step S2104. If NO in step S2103, the process proceeds to step S2105.

In step S2104, the size of data from the leading end of encoded data of the target block line to the next NAL unit is set as the amount of transmission data of the last block line in the last tile. Since a specific bit sequence, such as 0x000001, is included in the leading end of data of the NAL unit, the leading end of data can be correctly identified.

In step S2105, the size of data of the last block line in a tile other than the last tile is determined as the amount of transmission data. The size of data of the last block line in the tile is not given as a syntax element wpp_entry_point_offset. The size of data of the last block line is therefore calculated by subtracting the sizes of data of the processed tiles from the value of a syntax element tile_entry_point_offset[CurTile+1] indicating the size of encoded data of the target tile.

Processing (process of top block line decoding) in step S2004 in FIG. 20 will be described in detail below with reference to a flowchart of FIG. 6. Since the top block line is an even-numbered block line, encoded data of the target block line is supplied through the selector 1901 to the first block line decoding section 1902, in which the data is decoded. In this case, the selector 1901 outputs the encoded data as much as the transmission data amount (or the size of encoded data of the target block line) determined in step S2002 to the first block line decoding section 1902.

Figure 6:
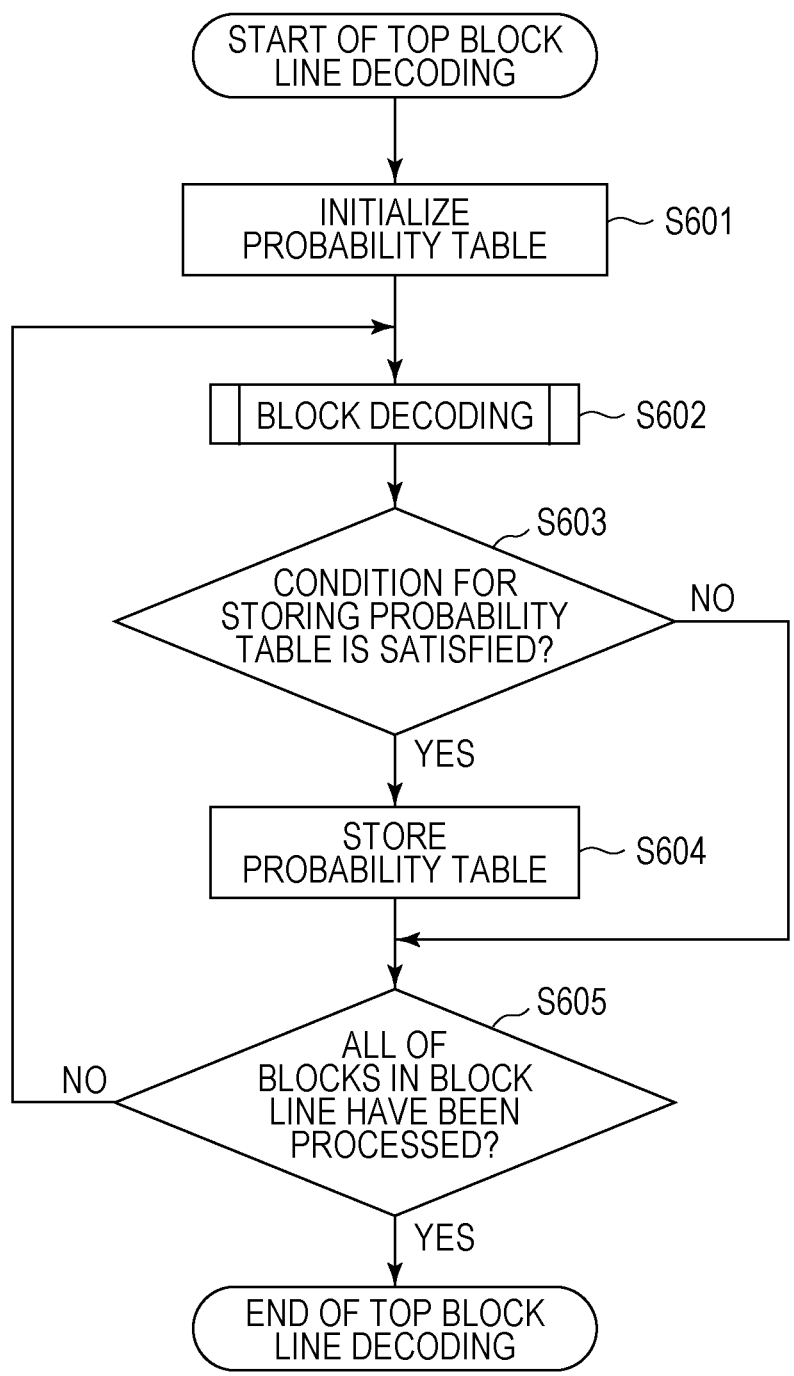
FIG. 6 is a flowchart illustrating a process of top block line decoding in each of the first and second embodiments.

Referring to FIG. 6, in step S601, the probability table is initialized by a predetermined method. The initialized probability table is used for arithmetic decoding of the first binary signal in the left block of the block line and is updated at any time in step S602, which will be described later. In the following description, the probability table used for arithmetic decoding of a binary signal in the first block of a block line will be referred to as a "block line reference probability table".

In step S602, the encoded data is decoded on a block-by-block basis by the first block line decoding section 1902, thus generating image data. The block-by-block basis decoding in step S602 will now be described in detail with reference to a flowchart of FIG. 8.

Figure 8:
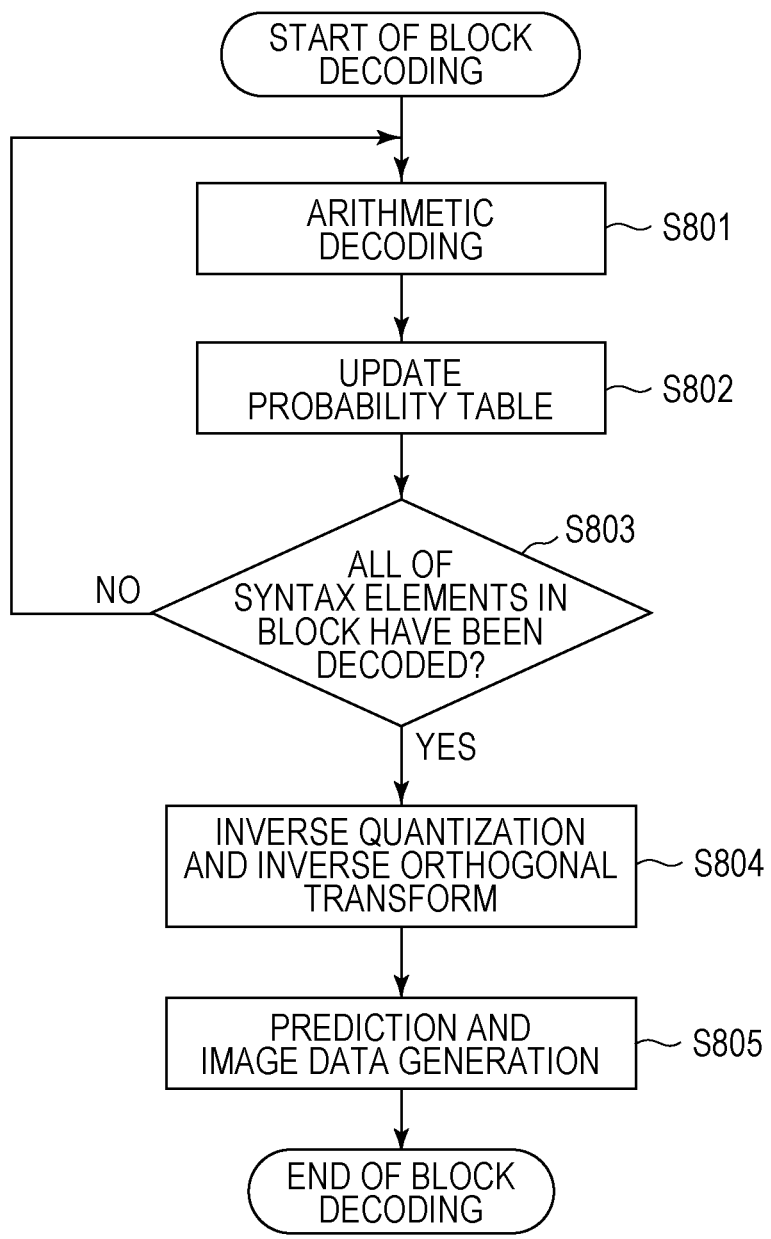
FIG. 8 is a flowchart illustrating a process of block decoding in the first and second embodiments.

Referring to FIG. 8, in step S801, encoded data is subjected to arithmetic decoding based on the probability table, thus generating a binary signal. Furthermore, the binary signal, binarized by any of various binarization schemes such as unary binarization and fixed length binarization, is decoded for each syntax element in a manner similar to H.264, thus generating a syntax element including a quantization coefficient. In step S802, the probability table is updated based on whether the arithmetically decoded binary signal is a symbol with higher probability. In step S803, whether all of the syntax elements in the block have been arithmetically decoded is determined. If all of the syntax elements have been arithmetically decoded (YES in step S803), the process proceeds to step S804. If NO in step S803, the process returns to step S801. The next syntax element is decoded. In step S804, the quantization coefficients are subjected to inverse quantization, thus generating transform coefficients. Furthermore, the transform coefficients are subjected to inverse orthogonal transform, thus generating prediction errors. In step S805, intra-prediction is performed based on pixels surrounding the target block, thus generating predicted image data. Furthermore, the prediction errors are added to the predicted image data, thus generating image data on a block-by-block basis.

Referring again to the flowchart of FIG. 6, in step S603, whether a condition for storing the probability table is satisfied is determined. In the present embodiment, a criterion as to whether a predetermined number of blocks are located between the block decoded in step S602 and the left end of the block line is the condition for storing the probability table. If the above condition is satisfied (YES in step S603), the process proceeds to step S604 and the probability table is stored as a first probability table in the first probability table storage section 1904. If the condition is not satisfied, the process proceeds to step S605. The first probability table is used as a block line reference probability table used for decoding of encoded data of the left block in the next block line.

In step S605, whether decoding of encoded data of all of the blocks in the target block line has been completed is determined. If the decoding has been completed (YES in step S605), the top block line decoding is terminated. If NO in step S605, the process returns to step S602 and the next block in the raster order is decoded.

Processing (or process of non-top block line decoding) in step S2005 in FIG. 20 will be described in detail with reference to a flowchart of FIG. 7. If the target block line is an even-numbered block line, encoded data of the target block line is supplied to and decoded by the first block line decoding section 1902. If the target block line is an odd-numbered block line, the encoded data of the target block line is supplied to and decoded by the second block line decoding section 1903. The selector 1901 outputs the encoded data as much as the transmission data amount (or the size of the encoded data of the target block line) determined in step S2002 to the first block line decoding section 1902 or the second block line decoding section 1903. A process of decoding encoded data of an odd-numbered block line in the second block line decoding section 1903 will now be described below.

Figure 7:
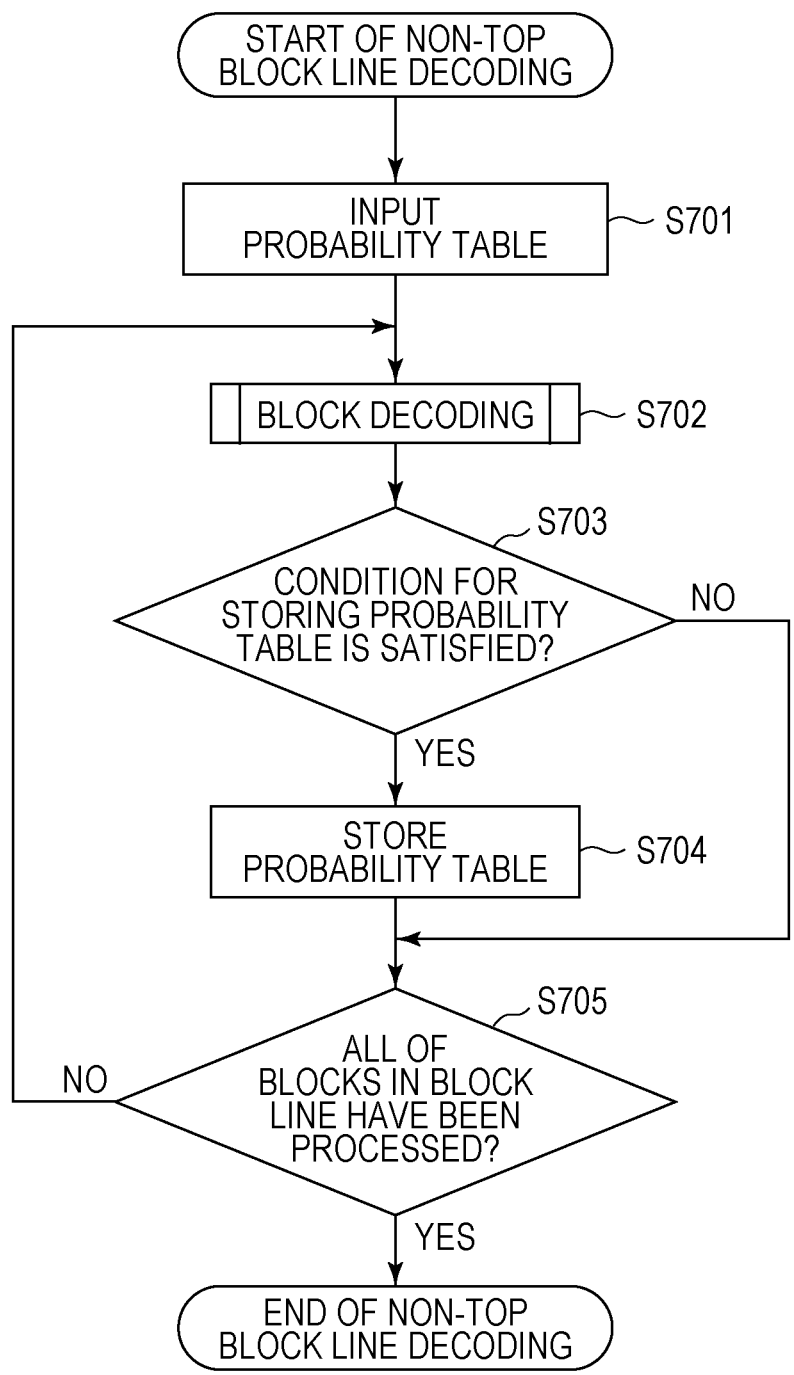
FIG. 7 is a flowchart illustrating a process of non-top block line decoding in the first and second embodiments.

Referring to FIG. 7, in step S701, the first probability table is supplied as the block line reference probability table from the first probability table storage section 1904.

Since processing in steps S702 and S703 is the same as that in steps S602 and S603, explanation is omitted. In step S704, the probability table is stored as a second probability table to the second probability table storage section 1905. The second probability table is used as a block line reference probability table for arithmetic decoding of encoded data of the left block in the next block line. Processing in step S705 is the same as that in step S605. In step S705, whether decoding of encoded data of all of the blocks in the odd-numbered block line has been completed is determined. A process of decoding encoded data of an even-numbered block line in the first block line decoding section 1902 will now be described below. In step S701, the second probability table is supplied as the block line reference probability table from the second probability table storage section 1905. Since processing in steps S702 to S705 is the same as that in steps S602 to S605, explanation is omitted.

The above-described configuration and operation enable the leading end of encoded data of each tile and the leading end of encoded data of each block line to be correctly identified. Accordingly, the data can be decoded in parallel on a tile-by-tile basis and the data of each tile can be further decoded in parallel on a block-line-by-block-line basis. Consequently, the division of a frame into tiles and the division of each tile into block lines allow enhancement of both parallelism and encoding efficiency.

Although the present embodiment has been described with respect to the case where the two tile decoding units and the two block line decoding sections are arranged, it is clear that additional arrangement of, for example, a third tile decoding unit, a third block line decoding section, and a third probability table storage section enables parallel processing by more decoding units and sections.

Second Embodiment

In an image encoding format to be decoded by an image decoding apparatus according to a second embodiment of the present invention, one frame is divided into a plurality of tiles that are rectangular regions in the same way as in the first embodiment. Since tile arrangement in the second embodiment is the same as that in the first embodiment illustrated in FIG. 2, explanation is omitted.

Figure 10:
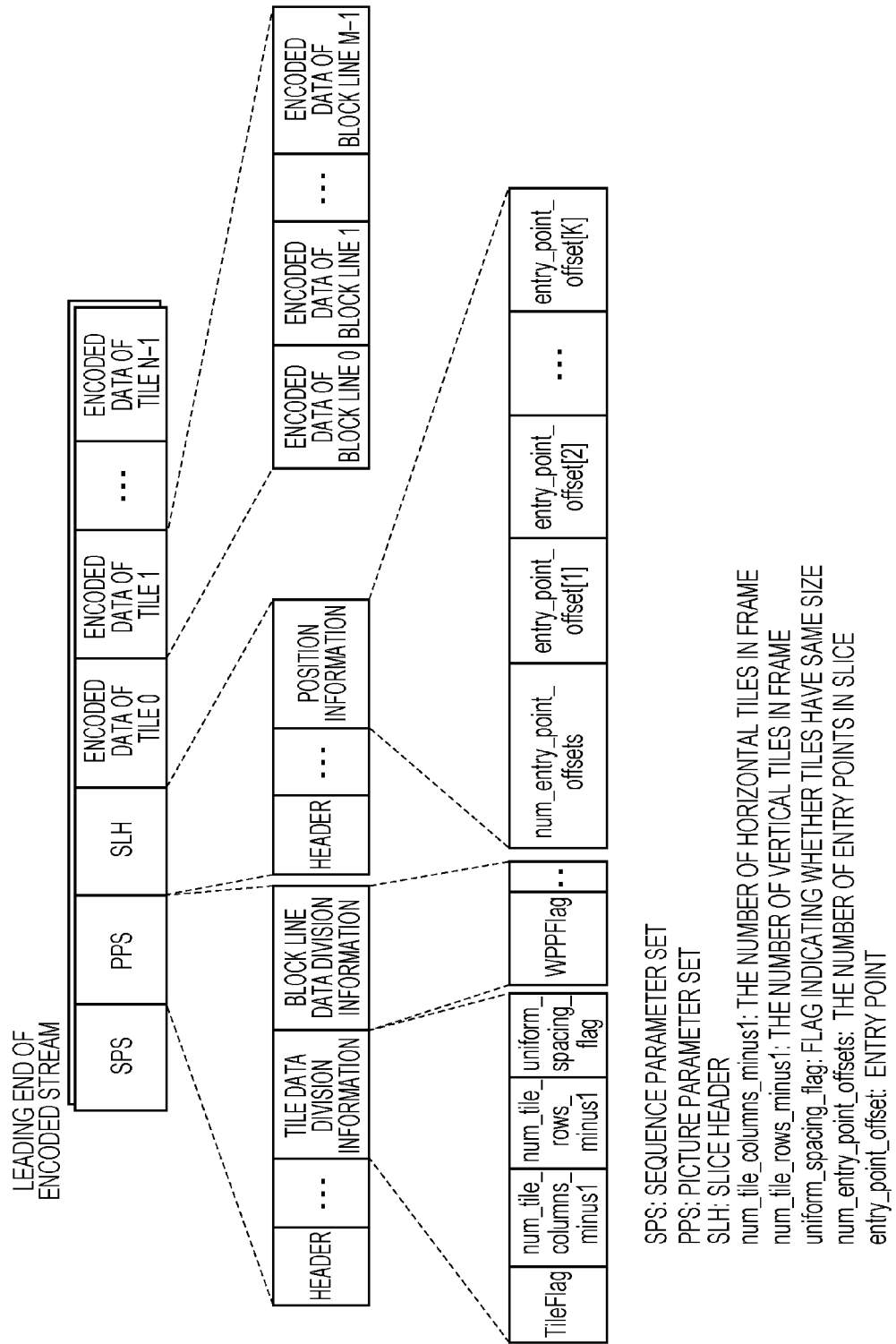
FIG. 10 is a diagram illustrating an image encoding format to be decoded by the image decoding apparatus according to the second embodiment.

FIG. 10 illustrates a format of HEVC-encoded data in the present embodiment. The encoded data of FIG. 10 is the same as that in the first embodiment, except for the slice header. Accordingly, only the slice header will be described below. In FIG. 10, when the flag TileFlag has a value of 1 or the flag WPPFlag has a value of 1, the slice header includes, as position information, a syntax element num_entry_point_offsets and syntax elements entry_point_offset.

If the flag TileFlag has a value of 1 and the flag WPPFlag has a value of 0, this means that the frame has been divided into a plurality of tiles, each tile has not been divided into block lines, and image data of each tile has been encoded. In this case, the syntax element num_entry_point_offsets has a value obtained by subtracting 1 from N that indicates the number of tiles in a slice. A syntax element entry_point_offset[i] indicates an entry point of encoded data of the ith tile. Since it is known that encoded data of the zeroth tile immediately follows the slice header, an entry point of the zeroth tile is omitted. The size of encoded data of the (i−1)th tile has been encoded as the syntax element entry_point_offset[i].

If the flag TileFlag has a value of 0 and the flag WPPFlag has a value of 1, this means that the frame is composed of a single tile, the tile has been divided into block lines, and image data of each block line has been encoded. In this case, the syntax element num_entry_point_offsets has a value obtained by subtracting 1 from the number of block lines in the slice. The syntax element entry_point_offset[i] indicates an entry point of encoded data of the ith block line. Since it is known that encoded data of the zeroth block line immediately follows the slice header, an entry point of the zeroth block line is omitted. The size of encoded data of the (i−1)th block line has been encoded as the syntax element entry_point_offset[i].

If the flag TileFlag has a value of 1 and the flag WPPFlag has a value of 1, this means that the frame has been divided into a plurality of tiles, each tile has been divided into block lines, and image data of each block line has been encoded. In this case, the syntax element num_entry_point_offsets has a value obtained by subtracting 1 from the product of the number N of tiles in the slice and the number M of block lines in each tile. The syntax element entry_point_offset[i] indicates an entry point of encoded data of the ith block line. Since it is known that encoded data of the zeroth block line immediately follows the slice header, an entry point of the zeroth block line is omitted. The size of encoded data of the (i−1)th block line has been encoded as the syntax element entry_point_offset[i].

If the flag TileFlag has a value of 0 and the flag WPPFlag has a value of 0, namely, in the case where the frame is composed of a single tile, the tile has not been divided into block lines, and image data of the tile has been encoded, the syntax element num_entry_point_offsets is treated as having a value of 0.

In the present embodiment, the flag TileFlag and the flag WPPFlag each have a value of 1. A slice of encoded data in the present embodiment is composed of four tiles. Since the number of vertical blocks in each tile is 135, the syntax element num_entry_point_offsets has a value of 4×135−1=539.

Encoded data in the image encoding format is decoded. Since the image decoding apparatus according to the present embodiment has the same configuration as that in the first embodiment illustrated in FIGS. 4 and 19, explanation is omitted.

An operation of the image decoding apparatus according to the present embodiment will be described in detail with reference to the flowchart of FIG. 5. Referring to FIG. 5, in step S501, the flags TileFlag and WPPFlag in the picture parameter set are analyzed in the same way as in the first embodiment, thus deriving position information from the slice header. In step S502, a variable CurTile is initialized to 0. In step S503, the amount of transmission data to be transmitted to the first tile decoding unit 402 or the second tile decoding unit 403 is determined in the bit stream analyzing unit 401 by a different process from that in the first embodiment.

Figure 11:
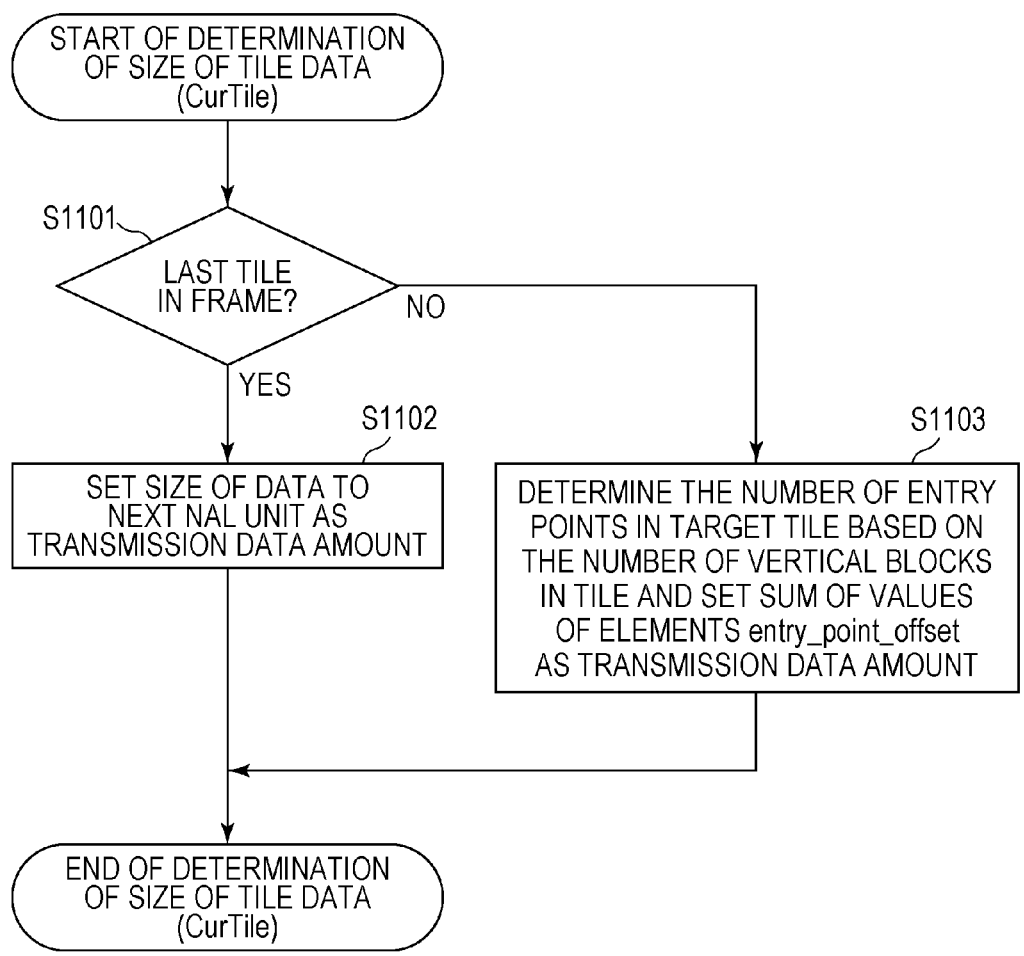
FIG. 11 is a flowchart illustrating a method of determination of the size of tile data in the second embodiment.

The process of determining the size of tile data in the present embodiment will be described with reference to a flowchart of FIG. 11. Since processing in steps S1101 and S1102 in FIG. 11 is the same as that in steps S901 and S902 in FIG. 9, explanation is omitted.

In step S1103, the number of entry points in a target tile is determined based on the number of vertical blocks in the tile and the sum of values of syntax elements entry_point_offset is set as the amount of transmission data. In the present embodiment, the number of vertical blocks in the tile is 135, which is fixed. Accordingly, the sum of values of syntax elements entry_point_offset[CurTile*135+1] to entry_point_offset[(CurTile+1)*135] is set as the transmission data amount. In the case where the tiles have different numbers of vertical blocks, the numbers of block lines of the tiles which have been processed are added to determine the position of a syntax element entry_point_offset[ ] from which addition starts.

Figure 12:
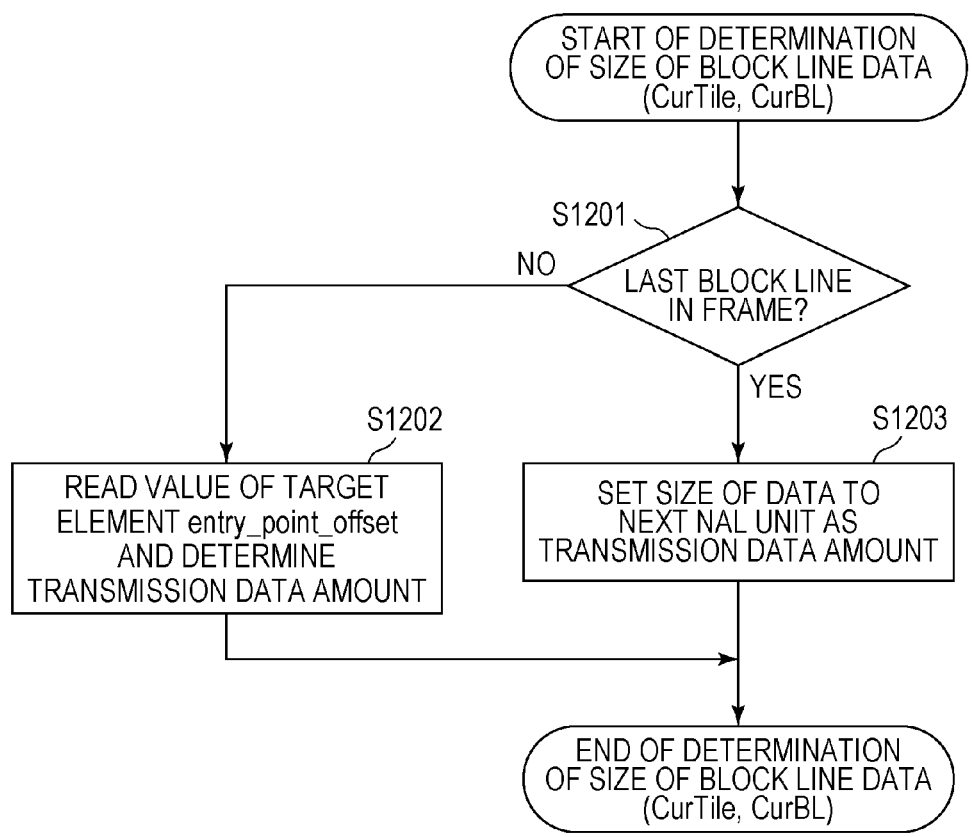
FIG. 12 is a flowchart illustrating a method of determination of the size of block line data in the second embodiment.

Referring again to FIG. 5, in step S504, tile decoding is performed by the first tile decoding unit 402 or the second tile decoding unit 403 in the same way as in the first embodiment. The tile decoding in step S504 will be described with reference to the flowchart of FIG. 20 in a manner similar to the first embodiment. The process of FIG. 20 in the present embodiment is the same as that in the first embodiment, except for processing of determination of the size of block line data in step S2002. Accordingly, only step S2002 will be described with reference to FIG. 12 in the present embodiment. Referring to FIG. 12, in step S1201, whether a target block line is the last block line in the frame is determined by the bit stream analyzing unit 401. If the target block line is the last block line (YES in step S1201), the process proceeds to step S1203. If NO in step S1201, the process proceeds to step S1202.

In step S1202, the value of a syntax element entry_point_offset indicating the size of encoded data of the target block line is read to determine the transmission data amount. Thus, the process of determination of the size of block line data is terminated. In the present embodiment, since the number of vertical blocks in each tile is 135, which is fixed, the syntax element entry_point_offset [CurTile×135+CurBL+1] is read. In the case where the tiles have different numbers of vertical blocks, the sum of the numbers of vertical blocks of the tiles processed has to be replaced with a value of CurTile×135.

In step S1203, the size of data from the leading end of encoded data of the target block line to the next NAL unit is set as the amount of transmission data. The process of determination of the size of block line data is terminated. Since a specific bit sequence, for example, 0x000001, is included in the leading end of data of the NAL unit, the leading end of data can be correctly identified.

Figure 5:
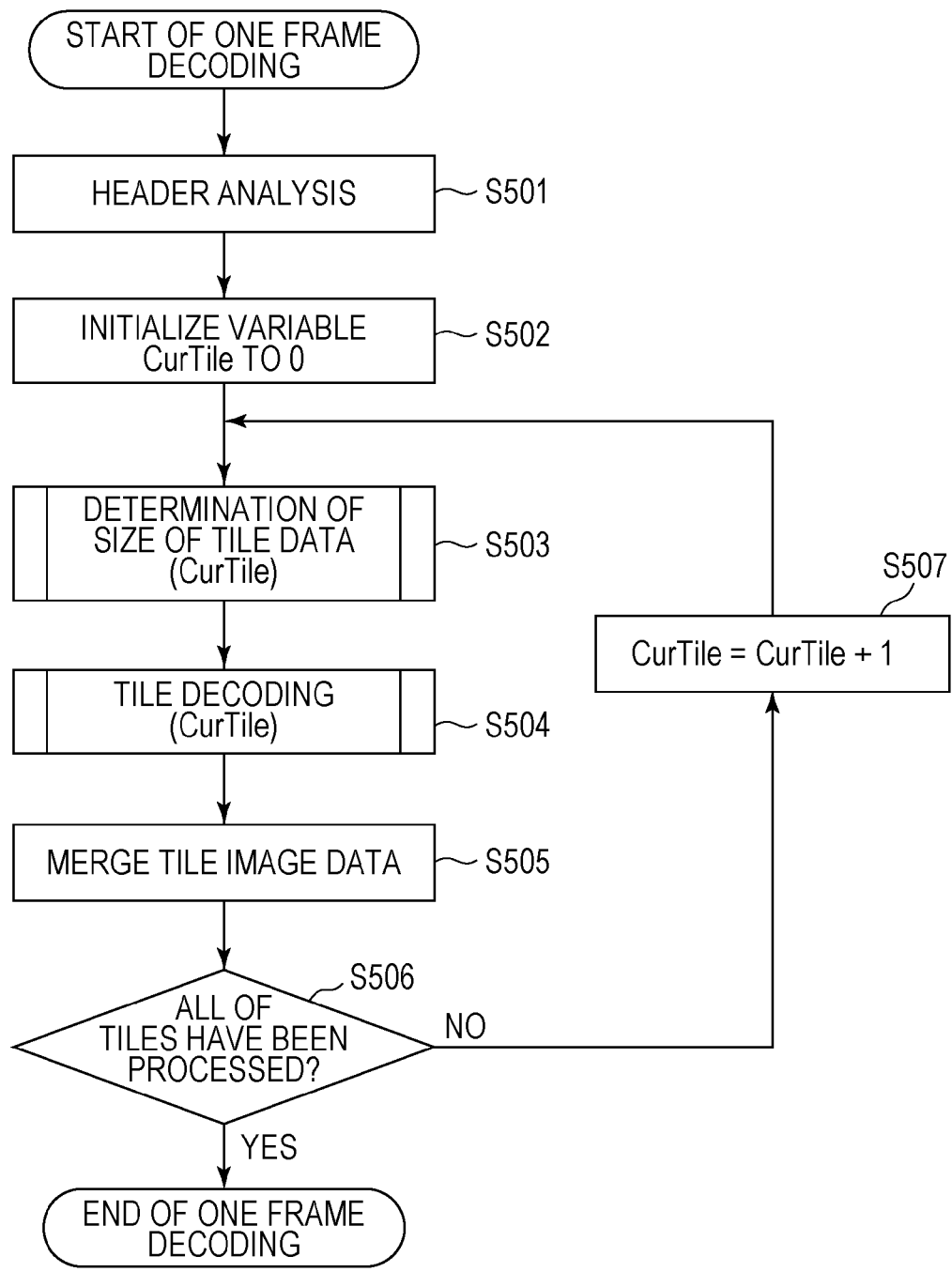
FIG. 5 is a flowchart illustrating an operation of the image decoding apparatus according to each of the first and second embodiments.

Since processing in steps S505 to S507 in FIG. 5 is the same as that in the first embodiment, explanation is omitted.

The above-described configuration and operation enable the leading end of encoded data of each tile and the leading end of encoded data of each block line to be correctly identified. Accordingly, the data can be decoded in parallel on a tile-by-tile basis and the data in each tile can be further decoded in parallel on a block-line-by-block-line basis. In the first embodiment, it is necessary to provide a syntax element indicating the number of entry points of tiles and syntax elements indicating the entry points of the tiles and further provide syntax element sets equal in number to the tiles, each syntax element set including a syntax element indicating the number of entry points of block lines in the tile and syntax elements indicating the entry points of the block lines. According to the present embodiment, each entry point is represented by the size of encoded data of a block line. Accordingly, it is unnecessary to separately provide information related to the entry points of tiles and information related to the entry points of block lines. Consequently, parallel decoding can be achieved with a smaller amount of information.

Although the present embodiment has been described with respect to the case where the two tile decoding units and the two block line decoding sections are arranged, it is clear that additional arrangement of, for example, a third tile decoding unit, a third block line decoding section, and a third probability table storage section enables parallel processing by more decoding units and sections.

Third Embodiment

In an image encoding format for encoding by an image encoding apparatus according to a third embodiment of the present invention, one frame is divided into a plurality of tiles that are rectangular regions in the same way as in the first embodiment. Since tile arrangement in the third embodiment is the same as that in FIG. 2 in the first embodiment, explanation is omitted. Note that the tile arrangement is not limited to that in FIG. 2.

Figure 13:
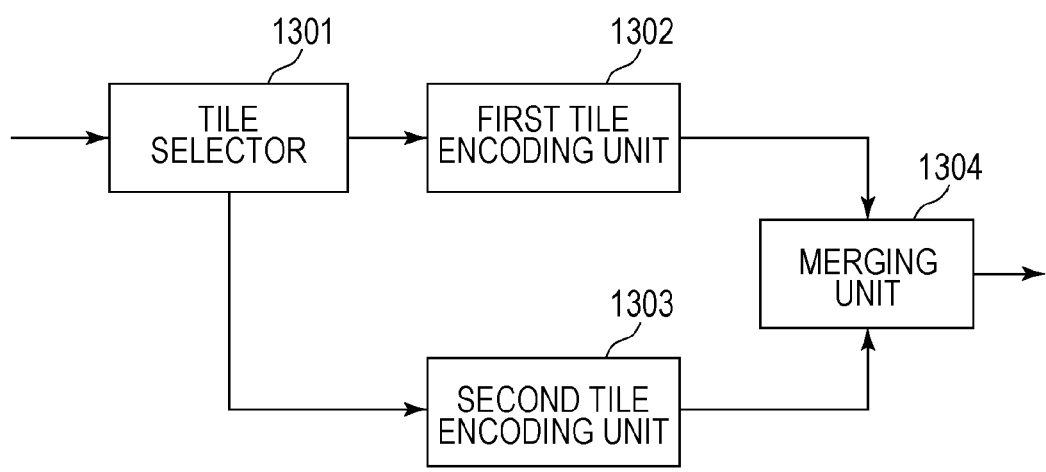
FIG. 13 is a block diagram illustrating a configuration of an image encoding apparatus according to each of a third embodiment and a fourth embodiment.

Although FIG. 1 illustrates the format of an HEVC-encoded stream in the present embodiment, explanation is omitted because it is the same as that in the first embodiment. FIG. 13 illustrates a configuration of the image encoding apparatus for generating an encoded stream in the image encoding format.

Referring to FIG. 13, a tile selector 1301 is configured to determine whether a target block belongs to an even-numbered tile. If the block belongs to an even-numbered tile, the tile selector 1301 outputs data of the block to a first tile encoding unit 1302. If the block does not belong to an even-numbered tile, the tile selector 1301 outputs the data of the block to a second tile encoding unit 1303.

The first and second tile encoding units 1302 and 1303 are configured to encode input image data of blocks on a tile-by-tile basis, each block being composed of n×n pixels (n is a positive integer greater than or equal to 2). Although arrangement of two tile encoding units is described in the present embodiment, the present invention is not limited thereto. In FIG. 2, image data items of Tile 0 and Tile 2 are encoded by the first tile encoding unit 1302 and image data items of Tile 1 and Tile 3 are encoded by the second tile encoding unit 1303.

The first tile encoding unit 1302 and the second tile encoding unit 1303 will be described in detail with reference to a block diagram of FIG. 23.

A block line selector 2301 is configured to determine whether a target block belongs to an even-numbered block line in the tile and select an output destination depending on the result of determination. A first block line encoding section 2302 is configured to encode image data of a block belonging to an even-numbered block line. A second block line encoding section 2303 is configured to encode image data of a block belonging to an odd-numbered block line. A first probability table storage section 2304 is configured to store a probability table generated by the first block line encoding section 2302 as encoding information. In the following description, the probability table stored in the first probability table storage section 2304 will be referred to as a first probability table. A second probability table storage section 2305 is configured to store a probability table generated by the second block line encoding section 2303 as encoding information. In the following description, the probability table stored in the second probability table storage section 2305 will be referred to as a second probability table. A block line data merging section 2306 is configured to merge encoded data generated by the first block line encoding section 2302 and encoded data generated by the second block line encoding section 2303 and output the merged data together with encoding parameters including position information.

The block line selector 2301 is supplied with image data on a tile-by-tile basis. If a target block belongs to an even-numbered block line, the block line selector 2301 outputs data of the block to the first block line encoding section 2302. If the target block does not belong to an even-numbered block line, the block line selector 2301 outputs the data of the block to the second block line encoding section 2303. Referring to FIG. 3, image data of the white blocks indicating the even-numbered block lines is encoded by the first block line encoding section 2302 and image data of the hatched blocks indicating the odd-numbered block lines is encoded by the second block line encoding section 2303. Since the top block line is the zeroth line, image data of the top block line is encoded by the first block line encoding section 2302. A process of encoding using the first block line encoding section 2302 and the second block line encoding section 2303 will be described in detail later.

Referring again to FIG. 13, a merging unit 1304 is configured to merge encoded data and encoding parameters generated by the first tile encoding unit 1302 and encoded data and encoding parameters generated by the second tile encoding unit 1303 into a bit stream and output the bit stream. The merging unit 1304 merges division information, such as the flags TileFlag and WPPFlag, into a picture parameter set and merge position information into a slice header and outputs the bit stream.

An operation of the image encoding apparatus according to the present embodiment will be described in detail with reference to flowcharts of FIGS. 14 to 17. In the present embodiment, images are input on a frame-by-frame basis. Each frame is composed of a plurality of tiles, each tile is divided into a plurality of blocks, and image data is encoded on a block-by-block basis. Although the images are input on a frame-by-frame basis in the present embodiment, the images may be input on a slice-by-slice basis, the slices being obtained by dividing the frame. Furthermore, although only intra-prediction encoding will be described in the present embodiment for ease of explanation, encoding is not limited thereto. The present embodiment may be applied to inter-prediction encoding.

Figure 14:
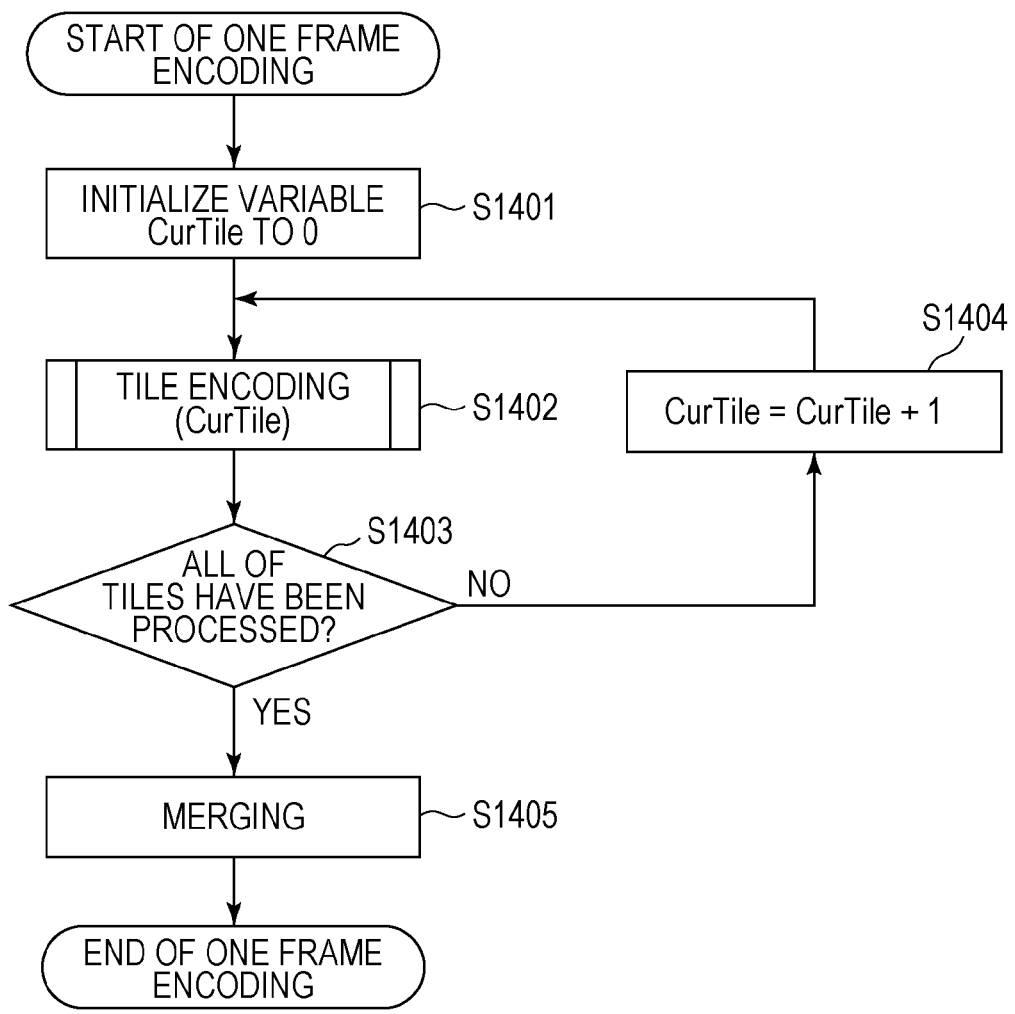
FIG. 14 is a flowchart illustrating an operation of the image encoding apparatus according to the third embodiment.

One frame encoding will be described with reference to FIG. 14. In step S1401, a variable CurTile indicating the number of a target tile is initialized to 0. In step S1402, tile encoding is performed in the first tile encoding unit 1302 or the second tile encoding unit 1303. In this case, the tile selector 1301 transmits data of an even-numbered tile to the first tile encoding unit 1302 and transmits data of an odd-numbered tile to the second tile encoding unit 1303. The tile encoding will be described in detail with reference to a flowchart of FIG. 24.

Figure 24:
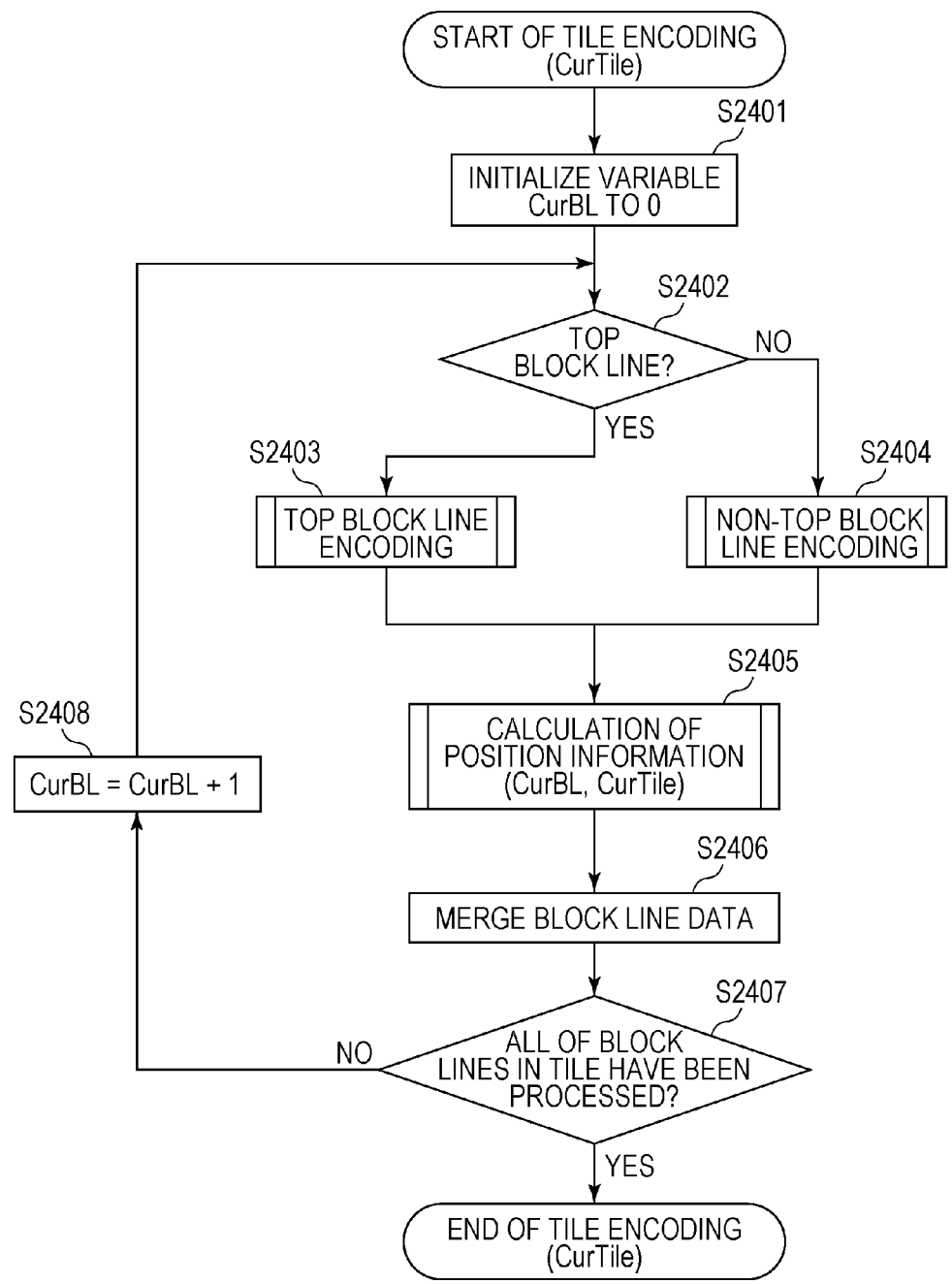
FIG. 24 is a flowchart illustrating a process of tile encoding in the third and fourth embodiments.

Referring to FIG. 24, in step S2401, a variable CurBL indicating the number of a target block line is initialized to 0. In step S2402, whether the target block line is the top block line in the tile is determined. If the target block line is the top block line (YES in step S2402), the process proceeds to step S2403. If NO in step S2402, the process proceeds to step S2404.

In step S2403, the top block line in the tile is encoded. In step S2404, data of a block line other than the top block line is encoded. Encoding in these steps will be described in detail later. In step S2405, position information (syntax elements tile_entry_point_offset and syntax elements wpp_entry_point_offset) to be contained in the slice header is set. Processing in this step will also be described in detail later.

In step S2406, encoded data output from the first block line encoding section 2302 and encoded data output from the second block line encoding section 2303 are merged by the block line data merging section 2306. In addition, the merged encoded data is merged with encoding parameters including the position information calculated in step S2405 and the resultant encoded data is output.

In step S2407, whether encoding of data of all of the block lines in the tile has been completed is determined. If the encoding has been completed (YES in step S2407), the tile encoding is terminated. If NO in step S2407, the process proceeds to step S2408.

In step S2408, the variable CurBL is incremented by one. This means that the next block line in the target tile becomes a target block line.

Referring again to FIG. 14, in step S1403, whether encoding of data of all of the tiles in the frame has been completed is determined. If the encoding has been completed (YES in step S1403), the process proceeds to step S1405. If NO in step S1403, the process proceeds to step S1404. In step S1404, the variable CurTile indicating the tile number is incremented by one. This means that the next tile becomes a target tile. In step S1405, encoded data output from the first tile encoding unit 1302 and encoded data output from the second tile encoding unit 1303 are merged by the merging unit 1304. In addition, the merged encoded data and encoding parameters including the position information calculated in step S2405 are merged into a bit stream and the bit stream is output.

The block line encodings included in the process of tile encoding in FIG. 24 will be described in detail below. First, the processing (or process of top block line encoding) in step S2403 will be described in detail with reference to a flowchart of FIG. 15. Since the top block line is an even-numbered block line, image data of the target block line is supplied through the tile selector 1301 to the first tile encoding unit 1302 and the image data is encoded by the first tile encoding unit 1302.

Figure 15:
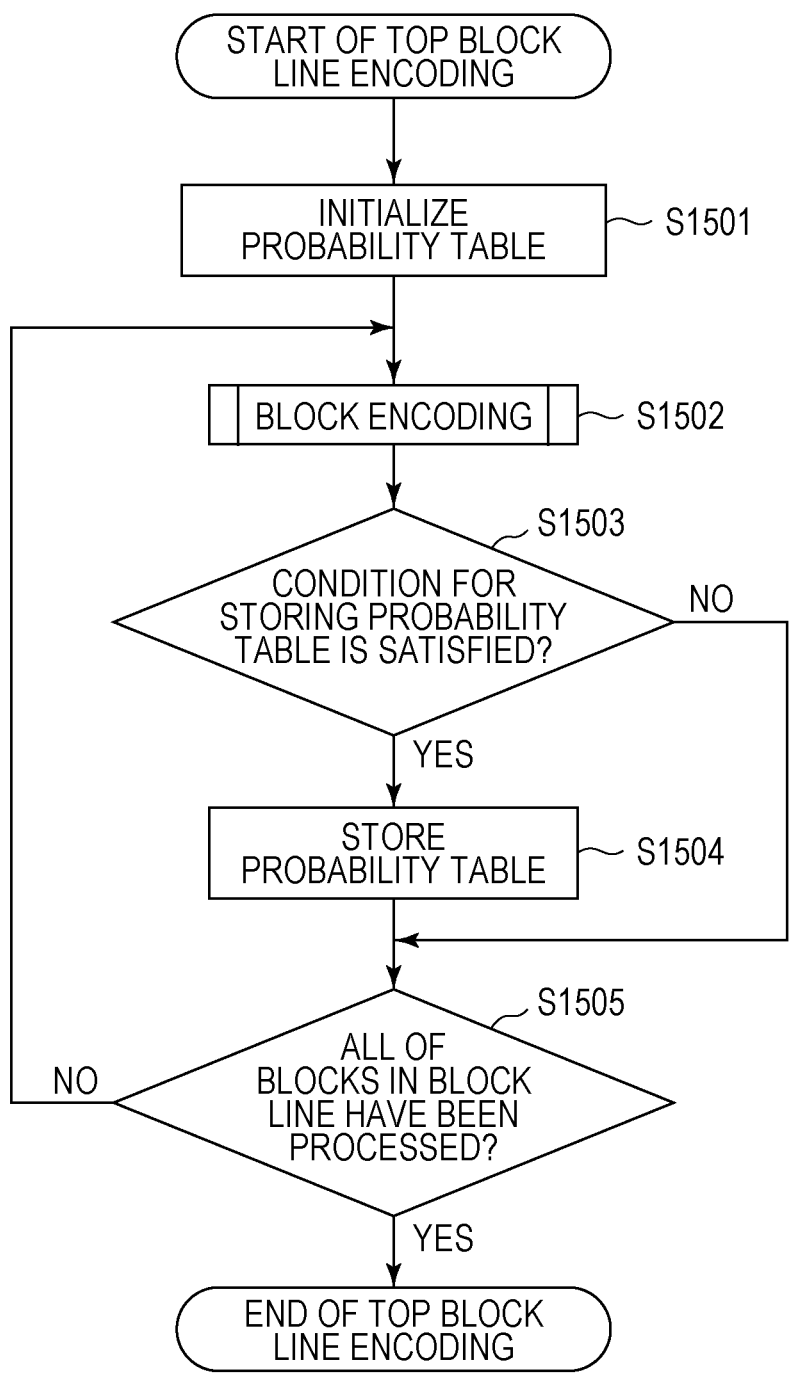
FIG. 15 is a flowchart illustrating a process of top block line encoding in the third embodiment.

Referring to FIG. 15, in step S1501, the probability table is initialized by a predetermined method. The initialized probability table is used for arithmetic encoding of a first binary signal of the left block in the block line and is updated at any time in step S1502, which will be described later. In the following description, the probability table used for arithmetic encoding of a binary signal of the first block in the block line will be referred to as a block line reference probability table.

In step S1502, image data is encoded on a block-by-block basis by the first tile encoding unit 1302, thus generating encoded data. Block encoding in step S1502 will be described in detail with reference to a flowchart of FIG. 16.

Figure 16:
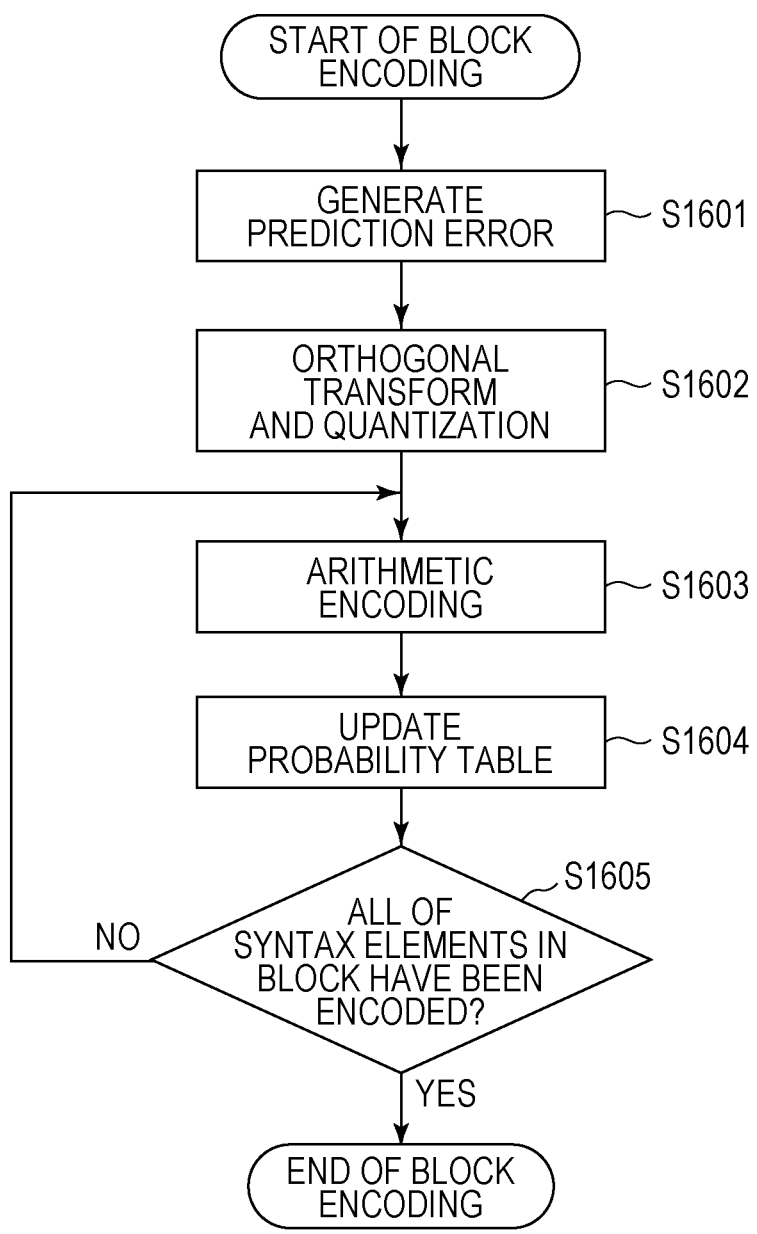
FIG. 16 is a flowchart illustrating a process of block encoding in the third embodiment.

Referring to FIG. 16, in step S1601, intra-prediction using pixels surrounding the block is performed on input image data of the block, thus generating prediction errors. In step S1602, the prediction errors are subjected to orthogonal transform, thus generating transform coefficients. Furthermore, the transform coefficients are quantized using quantization parameters determined based on, for example, image characteristics and the amount of symbols, thus generating quantization coefficients. In step S1603, a syntax element indicating, for example, a quantization parameter or a prediction mode, is binarized, thus generating a binary signal. Various binarization schemes, such as unary binarization and fixed length binarization, are used while being switched for each syntax element in a manner similar to H.264. Furthermore, the binary signal is subjected to arithmetic encoding based on the probability table. In step S1604, the probability table is updated based on whether the arithmetically encoded binary signal is a symbol with higher possibility. In step S1605, whether all of the syntax elements in the block have been arithmetically encoded is determined. If all of the syntax elements have been arithmetically encoded (YES in step S1605), the block encoding is terminated. If NO in step S1605, the process returns to step S1603, in which the next syntax element is encoded.

Referring again to the flowchart of FIG. 15, in step S1503, whether a condition for storing the probability table is satisfied is determined. In the present embodiment, a criterion as to whether a predetermined number of blocks are located between the block encoded in step S1502 and the left end of the block line is the condition for storing the probability table. If the above condition is satisfied (YES in step S1503), the process proceeds to step S1504. The probability table is stored as a first probability table to the first probability table storage section 2304. If the condition is not satisfied, the process proceeds to step S1505. The first probability table is used as the block line reference probability table for encoding of image data of the left block in the next block line.

In step S1505, whether encoding of data of all of the blocks in the target block line has been completed is determined. If the encoding has been completed (YES in step S1505), the top block line encoding is terminated. If NO in step S1505, the process returns to step S1502 and image data of the next block in the raster order is encoded.

Figure 17:
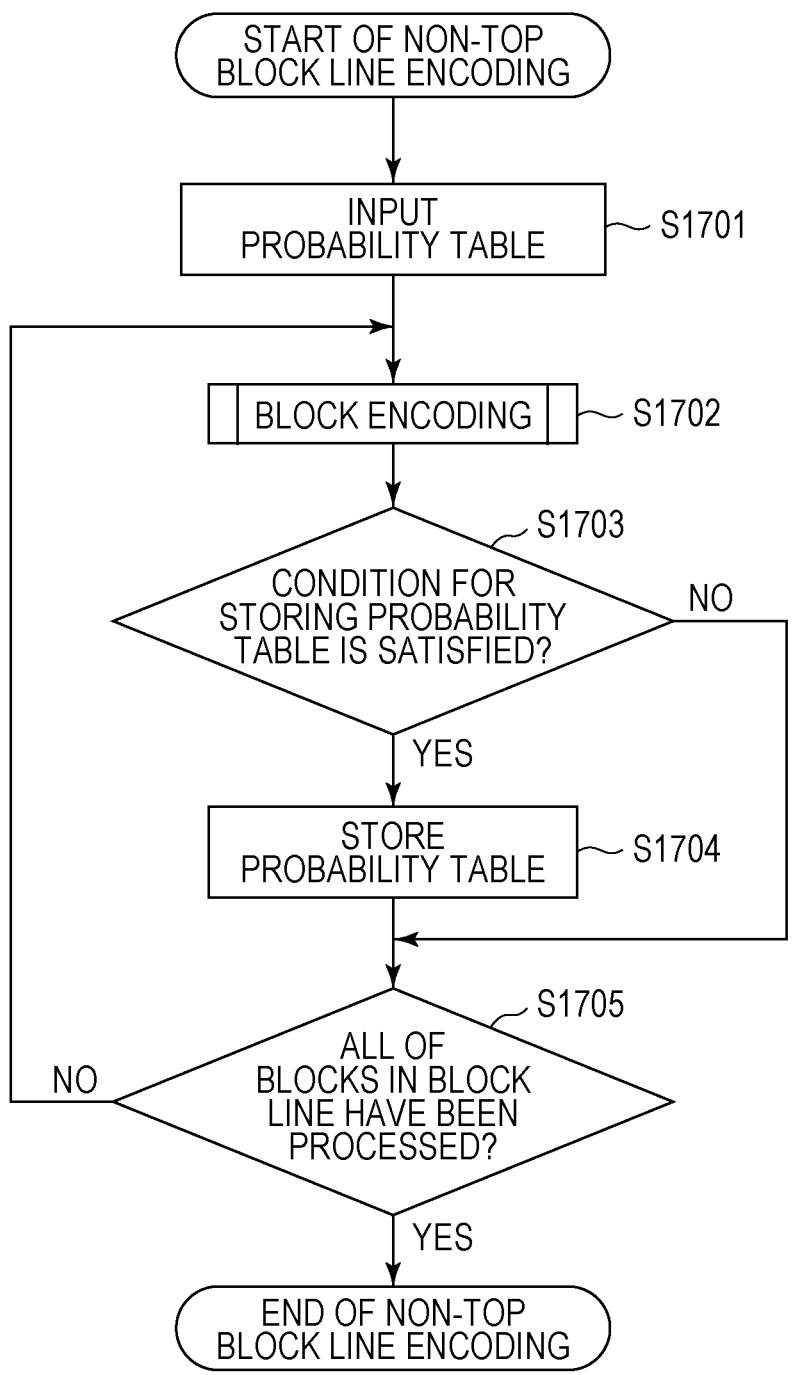
FIG. 17 is a flowchart illustrating a process of non-top block line encoding in the third embodiment.

Processing (or process of non-top block line encoding) in step S2404 in FIG. 24 will be described in detail with reference to a flowchart of FIG. 17. If a target block line is an even-numbered block line, image data of the target block line is supplied to and encoded by the first block line encoding section 2302. If the target block line is an odd-numbered block line, the image data of the target block line is supplied to and encoded by the second block line encoding section 2303. First, a process of encoding image data of an odd-numbered block line in the second block line encoding section 2303 will now be described below.

In step S1701, the first probability table is supplied as the block line reference probability table from the first probability table storage section 2304. Since processing in steps S1702 and S1703 is the same as that in steps S1502 and S1503, explanation is omitted. In step S1704, the probability table is stored as a second probability table to the second probability table storage section 2305. The second probability table is used as a block line reference probability table for arithmetic encoding of image data of the left block in the next block line. Processing in step S1705 is the same as that in step S1505. In step S1705, whether encoding of image data of all of the blocks in the odd-numbered block line has been completed is determined.

Next, a process of encoding image data of an even-numbered block line in the first block line encoding section 2302 will be described below. In step S1701, the second probability table is supplied as the block line reference probability table from the second probability table storage section 2305. Since processing in steps S1702 to S1704 is the same as that in steps S1502 to S1504, explanation is omitted. In step S1705, whether encoding of image data of all of the blocks in the even-numbered block line has been completed is determined.

Processing or process of calculating position information in step S2405 in FIG. 24 will be described in detail with reference to a flowchart of FIG. 18. In this process, the variable CurBL and the variable CurTile are given as inputs.

Figure 18:
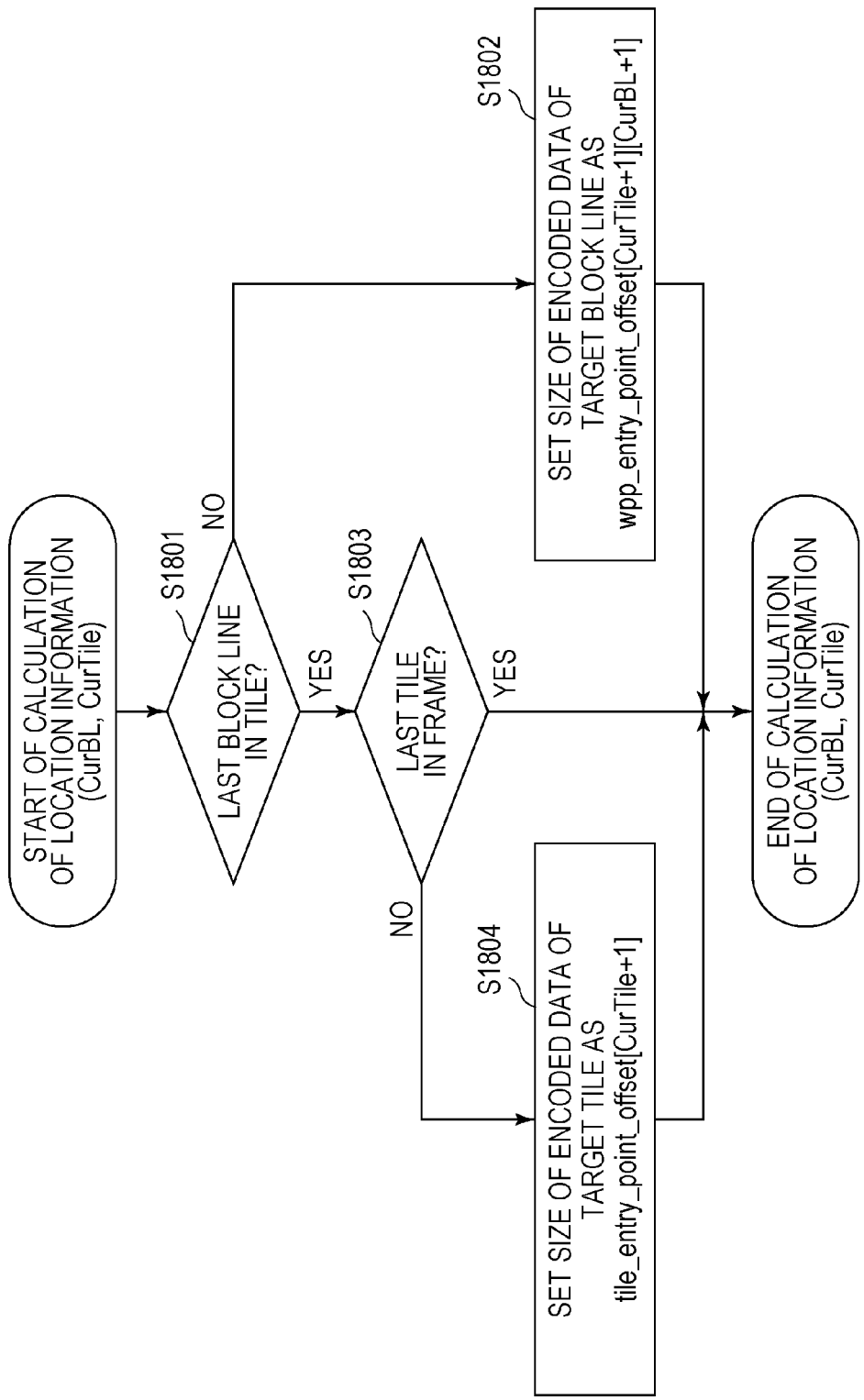
FIG. 18 is a flowchart illustrating a process of calculating position information in the third embodiment.

Referring to FIG. 18, in step S1801, whether a target block line is the last block line in a target tile is determined. If it is the last block line (YES in step S1801), the process proceeds to step S1803. If NO in step S1801, the process proceeds to step S1802.

In step S1802, the size of encoded data of the target block line is set as a syntax element wpp_entry_point_offset [CurTile+1][CurBL+1]. A syntax element wpp_entry_point_offset[CurTile][CurBL] indicates the size of encoded data of the (CurBL)th block line in the (CurTile)th tile.

In step S1803, whether the target tile is the last tile in the frame is determined. If it is the last tile, the process of calculating position information is terminated. If the target tile is not the last tile, the process proceeds to step S1804. If the target tile is the last tile, this means that the target block line is the last block line in the last tile. Information about the entry point of the block line is not encoded as a syntax element.

In step S1804, the size of encoded data of the target tile is set as a syntax element tile_entry_point_offset[CurTile+1] that indicates the size of encoded data of the (CurTile)th tile. Values of syntax elements wpp_entry_point_offset[ ] and syntax elements tile_entry_point_offset[ ] are merged into the slice header in step S1405 in FIG. 14.

The above-described configuration and operation enable division of an image into tiles and parallel encoding on a block-line-by-block-line basis. Accordingly, high-speed encoding can be achieved. Furthermore, since the leading end of encoded data of each tile and the leading end of encoded data of each block line can be correctly identified, a bit stream capable of being decoded in parallel on a tile-by-tile basis and being decoded in parallel on a block-line-by-block-line basis in each tile can be encoded. Thus, since a frame can be divided into tiles and each tile can be divided into block lines, both parallelism and encoding efficiency can be enhanced.

Although the present embodiment has been described with respect to the case where the two tile encoding units and the two block line encoding sections are arranged, it is clear that additional arrangement of, for example, a third tile encoding unit, a third block line encoding section, and a third probability table storage section enables parallel processing by more encoding units and sections.

Fourth Embodiment

In an image encoding format for encoding by an image encoding apparatus according to a fourth embodiment of the present invention, one frame is divided into a plurality of tiles that are rectangular regions in the same way as in the first embodiment. Since tile arrangement in the fourth embodiment is the same as that in the first embodiment illustrated in FIG. 2, explanation is omitted. Note that the tile arrangement is not limited to this arrangement.

The format of an HEVC-encoded stream in the present embodiment is illustrated in FIG. 10. The encoded stream in FIG. 10 is the same as that in the second embodiment. All of the entry points are indicated by entry points of block lines.

Figure 23:
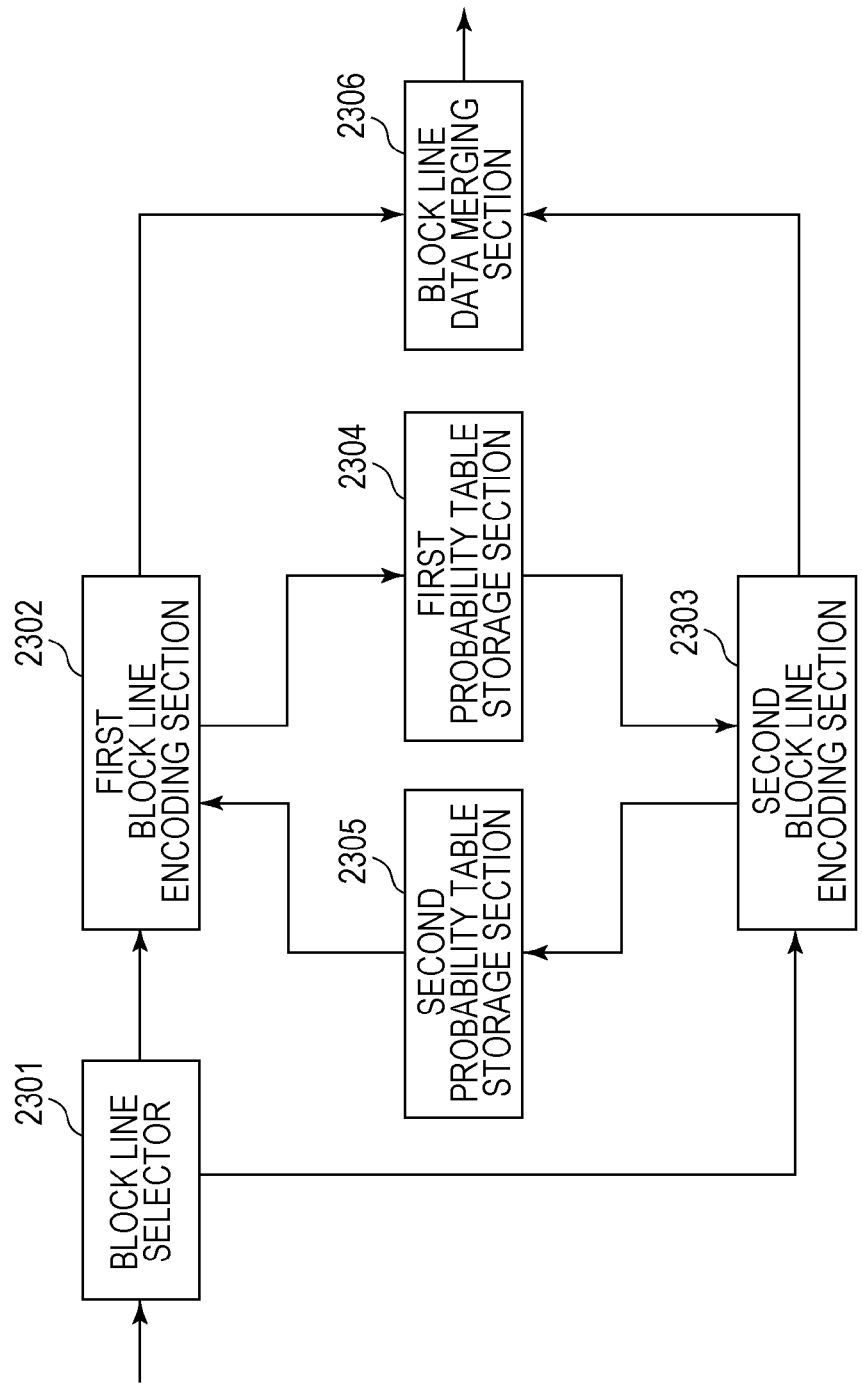
FIG. 23 is a block diagram illustrating a configuration of each tile encoding unit in the third and fourth embodiments.

FIGS. 13 and 23 illustrate a configuration (components) of the image encoding apparatus according to the present embodiment, the image encoding apparatus generating an encoded stream in the image encoding format according to the present embodiment. Since the image encoding apparatus according to the present embodiment has the same configuration as that in the third embodiment, explanation is omitted.

An operation of the image encoding apparatus according to the present embodiment is the same as that in the third embodiment, except for the processing of calculating position information in step S2405 in FIG. 24. Accordingly, only processing in step S2405 will be described with reference to FIG. 22.

Figure 22:
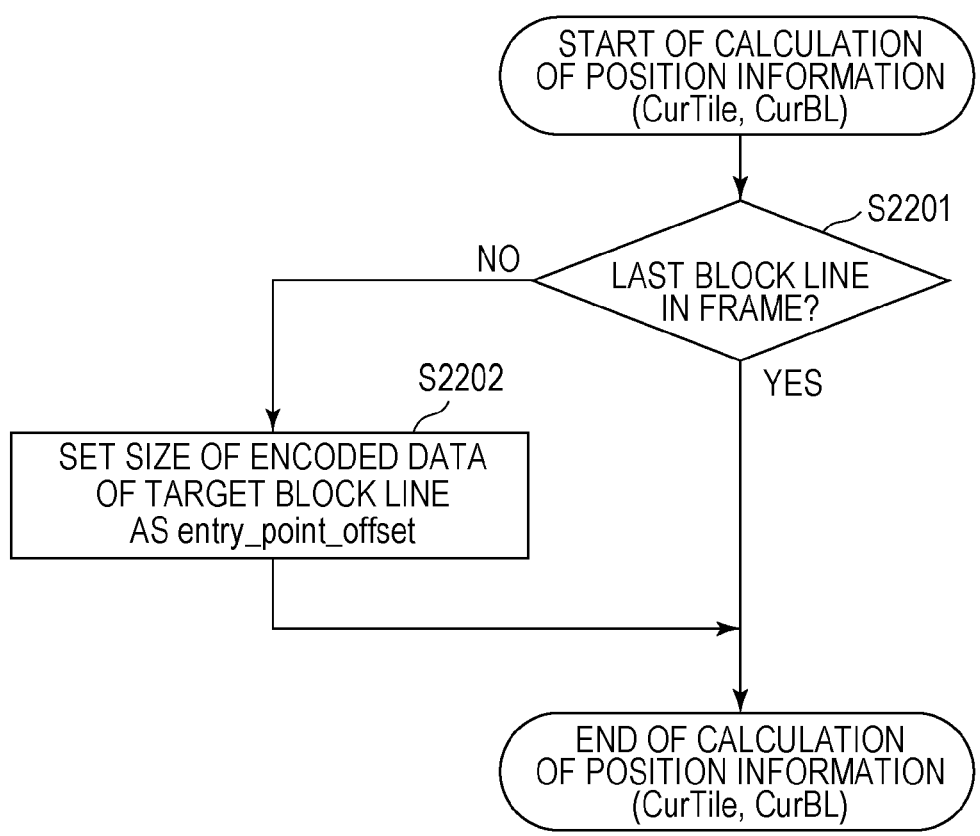
FIG. 22 is a flowchart illustrating a process of calculating position information in the fourth embodiment.

Referring to FIG. 22, in step S2201, whether a target block line is the last block line in a frame is determined. If it is the last block line (YES in step S2201), the process of calculating position information is terminated. If the target block line is not the last block line, the process proceeds to step S2202. If the target block line is the last block line, information about an entry point of the block line is not encoded as a syntax element.

In step S2202, the size of encoded data of the target block line is set as a syntax element entry_point_offset. In the present embodiment, since the number of vertical blocks in each tile is 135 which is fixed, the size of encoded data of the (CurBL)th block line in the (CurTile)th tile is set as a syntax element entry_point_offset[CurTile×135+CurBL+1]. If the tiles have different numbers of vertical blocks, it is necessary to replace the sum of the numbers of vertical blocks in the tiles processed with a value of CurTile×135.

The position information entry_point_offset obtained in step S2405 in FIG. 24 is merged as a syntax element into a slice header in step S1405 in the same way as in the third embodiment.

The above-described configuration and operation enable division of an image into tiles and parallel encoding on a block-line-by-block-line basis. Accordingly, high-speed encoding can be achieved. Furthermore, since the leading end of encoded data of each tile and the leading end of encoded data of each block line can be correctly identified, a bit stream capable of being decoded in parallel on a tile-by-tile basis and being decoded in parallel on a block-line-by-block-line basis in each tile can be encoded.

In the third embodiment, it is necessary to provide a syntax element indicating the number of entry points of tiles and syntax elements indicating the entry points of the tiles and further provide syntax element sets equal in number to the tiles, each syntax element set including a syntax element indicating the number of entry points of block lines in each tile and syntax elements indicating the entry points of the block lines. According to the present embodiment, each entry point is represented by the size of encoded data of a block line. Accordingly, it is unnecessary to separately provide information related to the entry points of the tiles and information related to the entry points of the block lines. Consequently, a stream capable of being subjected to parallel decoding with a smaller amount of information can be encoded.

Although the present embodiment has been described with respect to the case where the two tile encoding units and the two block line encoding sections are arranged, it is clear that additional arrangement of, for example, a third tile encoding unit, a third block line encoding section, and a third probability table storage section enables parallel processing by more encoding units and sections.

Fifth Embodiment

The above-described embodiments have been described on the assumption that the processing units and sections illustrated in FIGS. 4, 13, 19, and 23 are constructed by hardware. Processes performed by the processing units and sections in FIGS. 4, 13, 19, and 23 may be implemented by computer programs.

Figure 25:
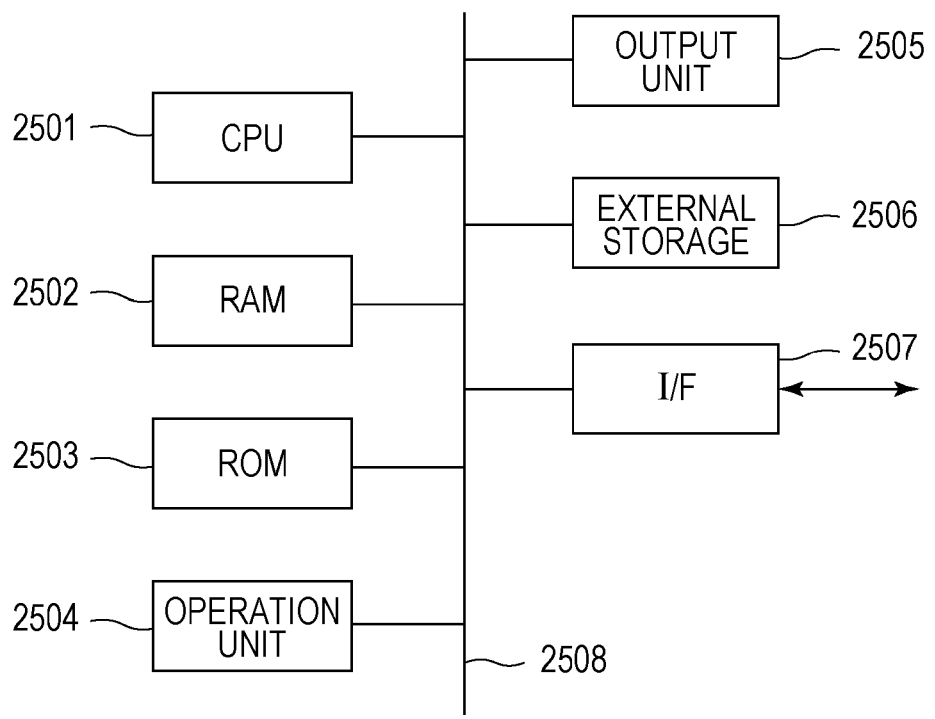
FIG. 25 is a block diagram illustrating an exemplary configuration of hardware of a computer applicable to each decoding apparatus according to the present invention.

FIG. 25 is a block diagram illustrating an exemplary configuration of hardware of a computer applicable to the image processing (decoding and encoding) apparatuses according to the above-described embodiments.

A CPU 2501 is configured to perform overall control of the computer based on computer programs and data stored in a RAM 2502 and a ROM 2503 and execute the above-described processes, performed by the image processing apparatuses according to the embodiments. In other words, the CPU 2501 functions as the processing units and sections illustrated in FIGS. 4, 13, 19, and 23.

The RAM 2502 has an area for temporarily storing a computer program and data loaded from an external storage 2506 and data obtained through an interface (I/F) 2507 from an external device. The RAM 2502 further has a work area used for execution of various processes by the CPU 2501. In other words, the RAM 2502 can function as a frame memory or appropriately provide various areas.

The ROM 2503 stores setting data of the computer, a boot program, and the like. An operation unit 2504 includes a keyboard and a mouse. When operated by a user of the computer, the operation unit 2504 can input various instructions to the CPU 2501. An output unit 2505 outputs a result of processing by the CPU 2501. The output unit 2505 can be constructed by a display device, e.g., a liquid crystal display, such that the result of processing can be displayed.

The external storage 2506 functions as a mass storage, such as a hard disk drive. The external storage 2506 stores an operating system (OS) and computer programs for allowing the CPU 2501 to achieve functions of the units and sections illustrated in FIGS. 4, 13, 19, and 23. The external storage 2506 may further store images to be processed.

The computer programs and data stored in the external storage 2506 are appropriately loaded to the RAM 2502 under the control of the CPU 2501 and serve as targets to be processed by the CPU 2501. The I/F 2507 can be connected to networks, such as a local area network (LAN) and the Internet, and other devices, such as a projector and a display device. The computer can receive and transmit various pieces of information through the I/F 2507. A bus 2508 connects the above-described components.

The operations described with reference to the foregoing flowcharts are controlled mainly by the CPU 2501.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image decoding apparatus capable of decoding a bit stream including data obtained by encoding an image including a tile, the tile including a plurality of block lines, the image decoding apparatus comprising:
   a number-of-blocks acquiring unit configured to acquire, from the bit stream, information indicating a number of blocks in a height direction in the tile;
   an entry point offset acquiring unit configured to acquire, from the bit stream, an entry point offset indicating a size of data corresponding to a block line included in the tile; and
   a decoding unit configured to decode the image including the tile based on the information acquired by the number-of-blocks acquiring unit and the entry point offset acquired by the entry point offset acquiring unit, in a case where the image includes a plurality of tiles and specific decoding processing is performed,
   wherein the specific decoding processing includes referring to information updated in decoding of a predetermined-numbered block in a first block line, in decoding of a first block in a second block line subsequent to the first block line.

2. The decoding apparatus according to claim 1, wherein the decoding unit is configured to decode the bit stream on a tile-by-tile basis and on a block-line-by-block-line basis, based on the information acquired by the number-of-blocks acquiring unit and the entry point offset acquired by the entry point offset acquiring unit.

3. The decoding apparatus according to claim 1, wherein the decoding unit is configured to identify an entry point of data corresponding to a block line based on the entry point offset acquired by the entry point offset acquiring unit.

4. The decoding apparatus according to claim 1, wherein an entry point offset corresponding to a j-th (j is a natural number equal to or larger than 2) block line included in a first tile included in the image is information indicating a size of data corresponding to a (j−1)th block line included in the first tile.

5. The decoding apparatus according to claim 3,
   wherein an entry point offset corresponding to a j-th (j is a natural number equal to or larger than 2) block line included in a first tile included in the image is information indicating a size of data corresponding to a (j−1)th block line included in the first tile, and
   wherein the decoding unit is configured to identify an entry point of data corresponding to a second tile next to the first tile, based on information indicating a number of blocks in the height direction in the first tile by adding a sum of sizes of data, the sizes respectively corresponding to the block lines included in the first tile.

6. The image decoding apparatus according to claim 1,
   wherein the number-of-blocks acquiring unit is configured to acquire, from header information of the bit stream, the information indicating the number of blocks in the height direction in the tile, and
   wherein the entry point offset acquiring unit is configured to acquire the entry point offset from the header information of the bit stream.

7. The image decoding apparatus according to claim 1, wherein the specific decoding processing is processing to decode the image on a block-line-by-block-line basis using wavefront parallel processing.

8. The image decoding apparatus according to claim 1, wherein the block line is a line-shaped aggregate of a plurality of blocks in the tile.

9. The image decoding apparatus according to claim 1, wherein the entry point offset acquiring unit is configured to acquire, from the bit stream, a number of entry point offsets.

10. The image decoding apparatus according to claim 1, wherein in a case where the image includes the plurality of tiles and the specific decoding processing is performed, a possible value of a number of entry point offsets corresponding to the block line in the image is a value obtained by subtracting 1 from a number based on a number of tiles.

11. The image decoding apparatus according to claim 1, wherein in a case where the image includes the plurality of tiles and the specific decoding processing is performed, the entry point offset acquiring unit acquires entry point offsets respectively corresponding to the block lines except for the first block line in a first tile included in the image and acquires entry point offsets respectively corresponding to the block lines except for the first block line in a second tile subsequent to the first tile in this order.

12. An image encoding apparatus capable of encoding an image including a tile, the tile including a plurality of block lines, the image encoding apparatus comprising:
   an encoding unit configured to perform specific encoding processing on an image including a plurality of tiles, the specific encoding processing including referring to information updated in encoding of a predetermined-numbered block in a first block line, in encoding of a first block in a second block line subsequent to the first block line, and
   a generation unit configured to generate an entry point offset indicating a size of data corresponding to a block line included in the tile, based on a number of blocks in a height direction in the tile and a size of data corresponding to the block line in the tile, in a case where the image includes a plurality of tiles and the specific encoding processing is performed by the encoding unit.

13. The image encoding apparatus according to claim 12, wherein an entry point offset, corresponding to a j-th (j is a natural number equal to or larger than 2) block line included in a first tile included in the image, is information indicating a size of data corresponding to a (j−1)th block line included in the first tile.

14. The image encoding apparatus according to claim 12, wherein the block line is a line-shaped aggregate of a plurality of blocks in the tile.

15. The image encoding apparatus according to claim 12, wherein the generation unit is configured to generate entry point offsets respectively corresponding to the block lines except for the first block line in a first tile included in the image and entry point offsets respectively corresponding to the block lines except for the first block line in a second tile subsequent to the first tile in this order.

16. The image encoding apparatus according to claim 12, wherein the specific encoding processing is processing to generate a bit stream that is able to be encoded on a block-line-by-block-line basis using wavefront parallel processing.

17. An image decoding method for decoding a bit stream including data obtained by encoding an image including a tile, the tile including a plurality of block lines, the image decoding method comprising:
   acquiring, from the bit stream, information indicating a number of blocks in a height direction in the tile;
   acquiring, from the bit stream, an entry point offset indicating a size of data corresponding to a block line included in the tile; and
   decoding the image including the tile based on the information acquired and the entry point offset acquired, in a case where the image includes a plurality of tiles and specific decoding processing is performed,
   wherein the specific decoding processing includes referring to information updated in decoding of a predetermined-numbered block in a first block line, in decoding of a first block in a second block line subsequent to the first block line.

18. An image encoding method for encoding an image including a tile, the tile including a plurality of block lines, the image encoding method comprising:
   performing specific encoding processing on an image including a plurality of tiles, the specific encoding processing including referring to information updated in encoding of a predetermined-numbered block in a first block line, in encoding of a first block in a second block line subsequent to the first block line, and
   generating an entry point offset indicating a size of data corresponding to a block line included in the tile, based on a number of blocks in a height direction in the tile and a size of data corresponding to the block line in the tile, in a case where the image includes a plurality of tiles and the specific encoding processing is performed.

19. A non-transitory computer readable medium storing a program for executing an image decoding method for decoding a bit stream including data obtained by encoding an image including a tile, the tile including a plurality of block lines, the image decoding method comprising:
   acquiring, from the bit stream, information indicating a number of blocks in a height direction in the tile;
   acquiring, from the bit stream, an entry point offset indicating a size of data corresponding to a block line included in the tile; and
   decoding the image including the tile based on the information acquired and the entry point offset acquired, in a case where the image includes a plurality of tiles and specific decoding processing is performed,
   wherein the specific decoding processing includes referring to information updated in decoding of a predetermined-numbered block in a first block line, in decoding of a first block in a second block line subsequent to the first block line.

20. A non-transitory computer readable medium storing a program for executing an image encoding method for encoding an image including a tile, the tile including a plurality of block lines, the image encoding method comprising:
   performing specific encoding processing on an image including a plurality of tiles, the specific encoding processing including referring to information updated in encoding of a predetermined-numbered block in a first block line, in encoding of a first block in a second block line subsequent to the first block line, and
   generating an entry point offset indicating a size of data corresponding to a block line included in the tile, based on a number of blocks in a height direction in the tile and a size of data corresponding to the block line in the tile, in a case where the image includes a plurality of tiles and the specific encoding processing is performed.

* * * * *